(12) United States Patent
Ooi et al.

(10) Patent No.: US 7,738,344 B2
(45) Date of Patent: Jun. 15, 2010

(54) LIQUID CRYSTAL LENS ELEMENT OPTICAL HEAD DEVICE

(75) Inventors: Yoshiharu Ooi, Tokyo (JP); Takuji Nomura, Koriyama (JP); Toshimasa Kakiuchi, Koriyama (JP); Mitsuo Oosawa, Koriyama (JP); Yuzuru Tanabe, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 597 days.

(21) Appl. No.: 11/625,005

(22) Filed: Jan. 19, 2007

(65) Prior Publication Data

US 2007/0127348 A1 Jun. 7, 2007

Related U.S. Application Data

(63) Continuation of application No. PCT/JP2005/013322, filed on Jul. 20, 2005.

(30) Foreign Application Priority Data

| Jul. 20, 2004 | (JP) | ............................ | 2004-211246 |
| Sep. 29, 2004 | (JP) | ............................ | 2004-284752 |
| Mar. 4, 2005 | (JP) | ............................ | 2005-060597 |

(51) Int. Cl.
  *G11B 7/00* (2006.01)
  *G11B 7/135* (2006.01)
(52) U.S. Cl. ................................. 369/112.02
(58) Field of Classification Search ....................... None
  See application file for complete search history.

(56) References Cited

U.S. PATENT DOCUMENTS 5,069,813 A 12/1991 Patel (Continued)

FOREIGN PATENT DOCUMENTS

JP 9-230300 9/1997

(Continued)

OTHER PUBLICATIONS

U.S. Appl. No. 11/589,088, filed Oct. 30, 2006, Ooi, et al.

(Continued)

*Primary Examiner*—Hoa T Nguyen
*Assistant Examiner*—Emily Frank
(74) *Attorney, Agent, or Firm*—Oblon, Spivak, McClelland, Maier & Neustadt, L.L.P.

(57) ABSTRACT

A liquid crystal lens element is provided, which does not produce change of transmission wavefront regardless of polarization state of incident light when it is off-state at a time of no voltage application, and which exhibits concave lens function for extraordinarily polarized incident light when it is on-state at a time of voltage application.

In a liquid crystal lens element 10 comprising a pair of transparent substrates 11 and 12 and a liquid crystal layer 16 sandwiched between the transparent substrates, which is configured to change convergent point of light transmitted through the element according to the magnitude of voltage applied to the liquid crystal layer 16, the liquid crystal lens element 10 further comprises a Fresnel lens 17 having a concave-convex-shaped cross section formed on the transparent substrate 11, a first transparent electrode 13 formed on a flat surface of the transparent substrate 11 on which the Fresnel lens 17 is formed, and a second transparent electrode 14 formed on a flat surface of the other transparent substrate 12.

6 Claims, 10 Drawing Sheets

U.S. PATENT DOCUMENTS

| | | | |
|---|---|---|---|
| 6,172,957 | B1 | 1/2001 | Ogasawara |
| 6,469,683 | B1 | 10/2002 | Suyama et al. |
| 6,618,343 | B1 * | 9/2003 | Saitoh et al. ............ 369/112.01 |
| 2002/0047837 | A1 | 4/2002 | Suyama et al. |
| 2003/0095334 | A1 | 5/2003 | Kim et al. |
| 2003/0227858 | A1 | 12/2003 | Komma |
| 2004/0016427 | A1 | 1/2004 | Byron et al. |
| 2004/0100879 | A1 | 5/2004 | Ogasawara |
| 2004/0160389 | A1 | 8/2004 | Suyama et al. |
| 2004/0170107 | A1 * | 9/2004 | Iwasaki et al. ......... 369/112.02 |
| 2004/0264347 | A1 * | 12/2004 | Wada et al. ............ 369/112.02 |
| 2005/0181128 | A1 * | 8/2005 | Nikolov et al. ........... 427/248.1 |
| 2005/0226122 | A1 | 10/2005 | Ooi et al. |
| 2006/0280100 | A1 | 12/2006 | Ooi et al. |
| 2007/0182915 | A1 | 8/2007 | Osawa et al. |

FOREIGN PATENT DOCUMENTS

| | | |
|---|---|---|
| JP | 10-26705 A | 1/1998 |
| JP | 10-48597 A | 2/1998 |
| JP | 10-269611 | 10/1998 |
| JP | 2003-207714 | 7/2003 |
| JP | 2004-71134 | 3/2004 |
| JP | 2004-103058 | 4/2004 |
| JP | 2004-138895 | 5/2004 |

OTHER PUBLICATIONS

U.S. Appl. No. 11/621,128, filed Jan. 9, 2007, Nomura, et al.
U.S. Appl. No. 11/670,780, filed Feb. 2, 2007, Murata, et al.
U.S. Appl. No. 11/923,851, filed Oct. 25, 2007, Shimozono, et al.
U.S. Appl. No. 11/737,177, filed Apr. 19, 2007, Osawa, et al.
Ernst Lueder, "Liquid Crystal Displays", Addressing Schemes and Electro-Optical Effects, ISBN, XP002537956, 2001, pp. 6-8.

* cited by examiner

Fig.8(A) Wavelength: $\lambda_1$ Voltage: $V_0$
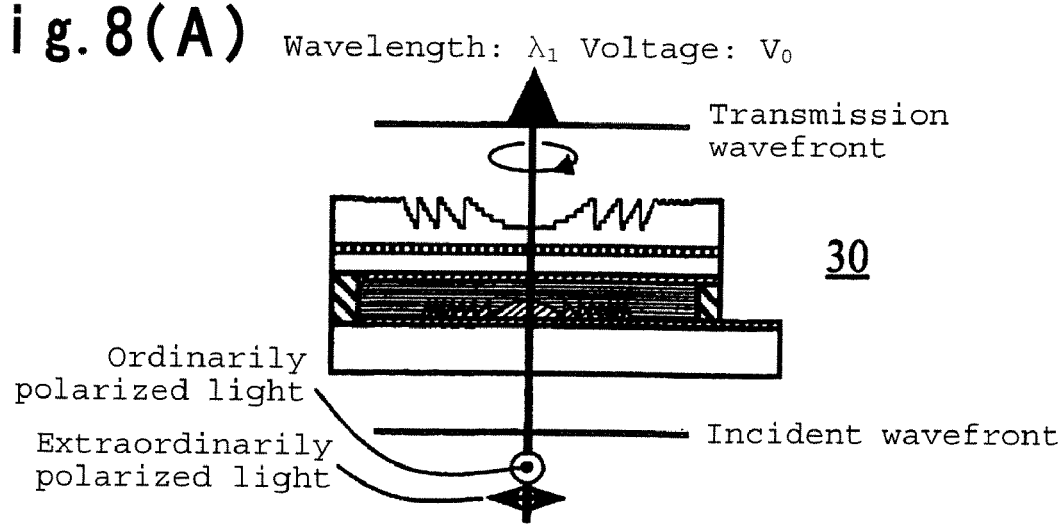
Fig.8(B) Wavelength: $\lambda_2$ Voltage: $V_0$
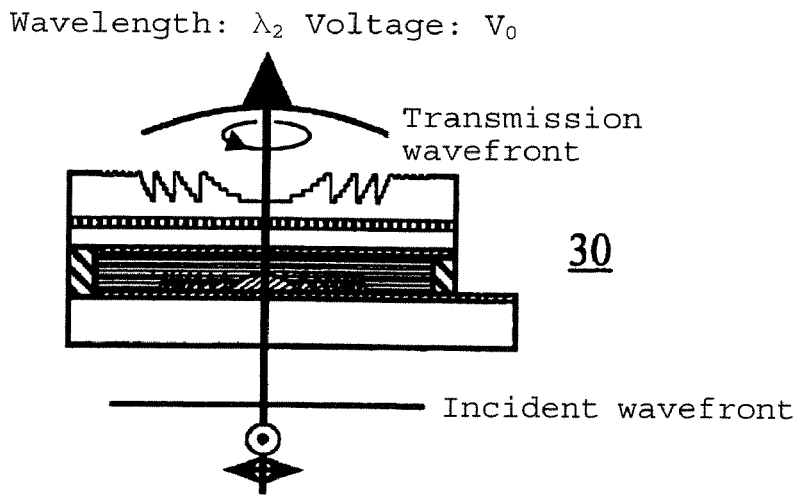
Fig.8(C) Wavelength: $\lambda_3$ Voltage: $V_P$
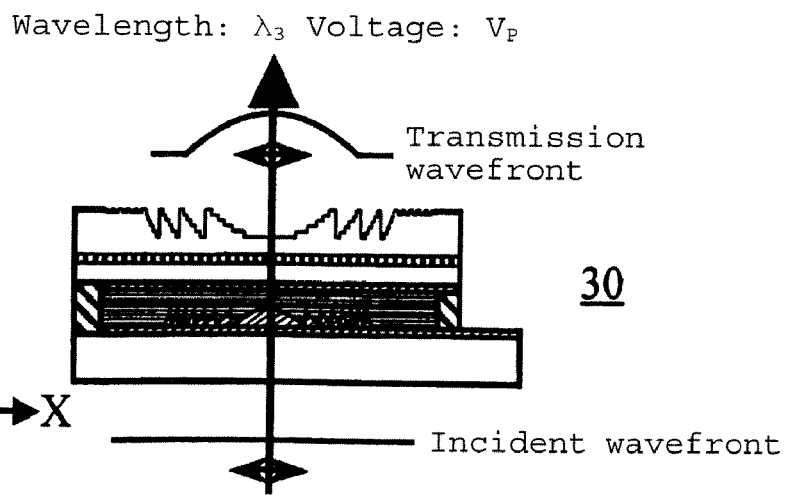

Fig. 13(A)
Voltage: $V_0$
Fig. 13(B)
Voltage: $V_P$
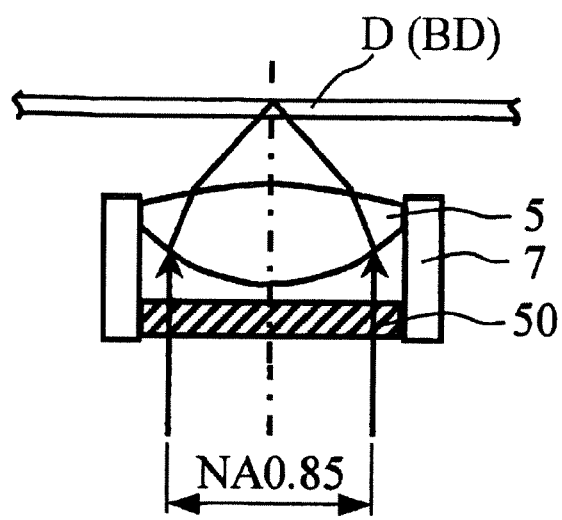
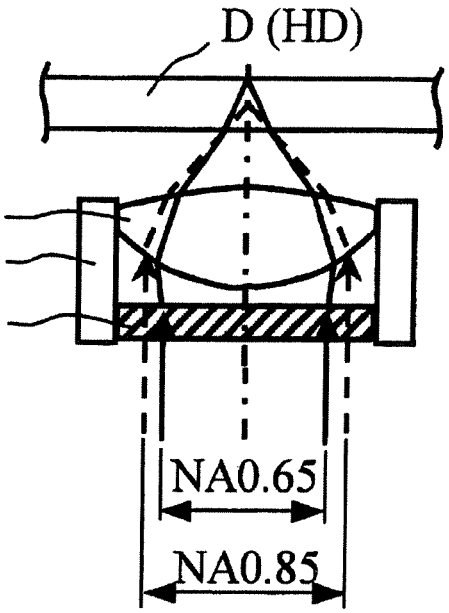
Fig. 14
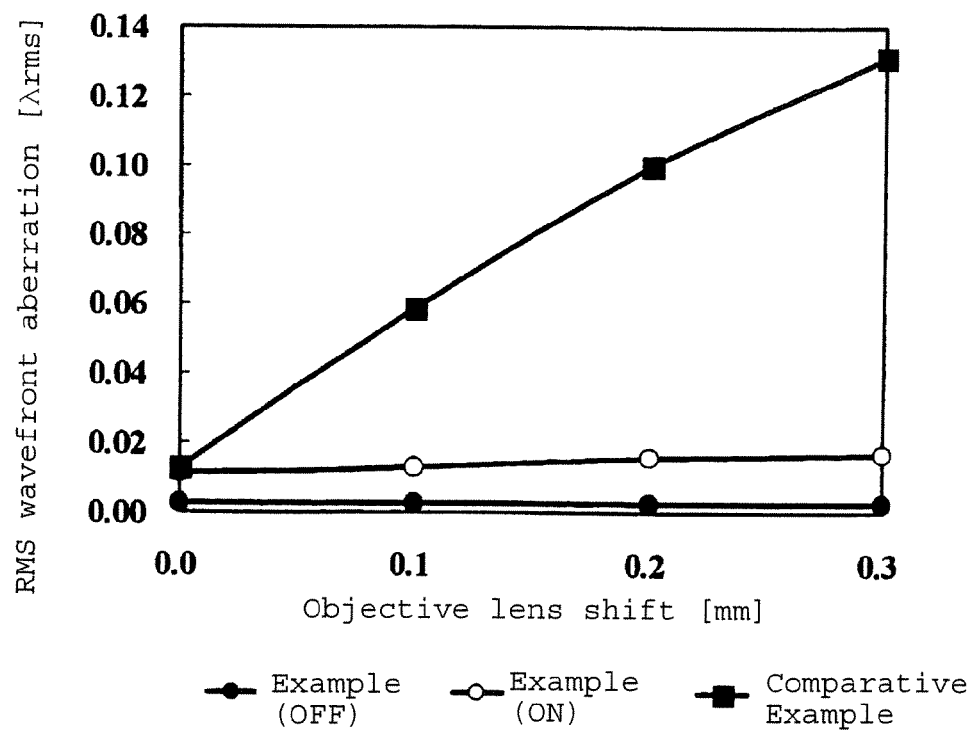

PRIOR ART

LIQUID CRYSTAL LENS ELEMENT OPTICAL HEAD DEVICE

TECHNICAL FIELD

The present invention relates to a liquid crystal lens element which does not change transmission wavefront regardless of polarization state of incident light when no voltage is applied to the element and the element is off-state, and which changes transmission wavefront when a voltage is applied to the element and the element is on-state, and the present invention relates to an optical head device which can write and/or read information to/from a plurality of optical recording media having different cover layer thicknesses.

BACKGROUND ART

As an optical recording medium (hereinafter referred to as "optical disk") having an information recording layer formed on a light incident side surface and a cover layer being a transparent resin layer covering the information recording layer, an optical disk for CD (hereinafter referred to as CD optical disk or "CD") having a cover layer thickness for information recording layer (hereinafter referred to as "cover thickness") of 1.2 mm, or an optical disk for DVD (hereinafter referred to as DVD optical disk or "DVD") having a cover thickness for information recording layer of 0.6 mm and the like are widely used. Meanwhile, as an optical head device to be used for writing and/or reading (hereinafter referred to as "writing/reading" of an information to/from a CD, one having a laser diode of wavelength $\lambda_3$ (hereinafter referred to as "wavelength $\lambda_3$ of CD") in a 790 nm band as a light source and an objective lens of NA (numerical aperture) 0.45 to 0.50, has been known. Further, as an optical head device to be used for writing/reading to/from a DVD, one having a laser diode of wavelength $\lambda_2$ (hereinafter referred to as "wavelength $\lambda_2$ of DVD") in a 660 nm band as a light source and an objective lens of NA 0.6 to 0.65, is employed.

Further, in recent years, in order to improve recording density of an optical disk, an optical disk having a cover thickness of 0.1 mm (hereinafter referred to as BD optical disk or "BD") has been developed. As an optical head device to be used for writing/reading such a BD, one having a blue laser diode of wavelength $\lambda_1$ (hereinafter referred to as "wavelength $\lambda_1$ of BD") in a 405 nm wavelength band as a light source and an objective lens of NA 0.85, is employed. However, when writing/reading to/from a DVD or a CD is carried out using an objective lens optimally designed to make wavefront aberration substantially zero for BD at the wavelength $\lambda_1$ (hereinafter referred to as "objective lens for BD"), a large spherical aberration due to the difference of cover thicknesses of optical disks, is generated. As a result, convergence of incident light on an information recording layer is deteriorated, which prevents good writing/reading. Under these circumstances, development of small sized three-wavelength compatible optical head device has been investigated, which can write/read three types of optical disks having different cover thicknesses using single objective lens. By the way, as one of the optical head devices to realize such a three-wavelength compatible optical head device, an optical head device has been proposed (for example, JP-A-2004-71134), which can write/read a DVD using an objective lens for BD and a Fresnel lens.

The optical head device employs as a Fresnel lens, a hologram grating having a step-shaped cross-section formed in a region corresponding to NA for DVD. The Fresnel lens is formed to have a (Fresnel lens) shape exhibiting a concave lens function at the wavelength $\lambda_2$ for DVD, in which each unit step height of the step-shaped cross-section corresponds to an optical path difference of about one wavelength for light of wavelength $\lambda_1$ of BD, and the Fresnel lens is to be used integrally with an objective lens for BD. By this construction, an optical head device which can write/read BDs and DVDs is constituted. However, since there is no aberration correction function for CDs, it is difficult to write/read three types of optical disks.

Further, an optical head device which reduces a spherical aberration generated due to the difference between cover thicknesses of CD, DVD and BD by a phase corrector, has been proposed (for example, JP-A-2003-207714).

The optical head device has a phase correction element for DVD which is a phase correction surface having a step-shaped cross-section, formed in a region corresponding to NA for DVD, and a phase correction element for CD which is a phase correction surface having a step-shaped cross-section formed in a region corresponding to NA for CD, and they are used integrally with an objective lens for BD.

Each unit step height of a step-shaped cross-section of a phase correction surface for DVD, is made to be a step height providing an optical path difference of substantially an integer times of wavelength $\lambda_1$ of BD and wavelength $\lambda_3$ of CD, so as to exhibit spherical aberration correction function only for wavelength $\lambda_2$ for DVD. Further, each unit step height of the step-shaped cross-section of the phase correction surface for CD, is made to be a step height providing an optical path difference of substantially an integer times of wavelength $\lambda_1$ of BD and wavelength $\lambda_2$ of DVD, so as to exhibit spherical aberration correction function only for wavelength $\lambda_3$ of CD.

However, in order to exhibit desired wavelength selectivity in each phase correction element, a glass material having a special refractive-index-wavelength-dispersion is required, and accurate fabrication of a plurality of deep step height is required, and thus, it is difficult to stably obtain wavelength-selective aberration correction function. Further, since the phase correction element corrects only spherical aberrations, the element does not show concave lens function for expanding the distance (hereinafter referred to as "working distance") between the objective lens and an optical disk. Accordingly, in a case where the objective lens for BD is used integrally with a phase correction element for CD, working distance for CD becomes at most 0.3 mm, and it is difficult to stably write/read an optical disk without contact of the optical disk and the objective lens when the optical disk is rotating.

Here, a concave lens function can be exhibited by making the phase correction surface of the phase correction element for CD to have a Fresnel lens shape shown in JP-A-2004-71134. However, in this case, step height of the concave-convex portion and the number of annular rings are increased, which causes diffraction light of high diffraction order due to wall surfaces of the steps at the wavelengths $\lambda_1$ of BD and $\lambda_2$ of DVD, and thus, efficiency of transmission wavefront corresponding to desired concave lens function is reduced, such being problematic.

As means for correcting such a spherical aberration generated due to the difference of cover thicknesses of e.g. optical disks, an optical head device employing an optical modulation element corresponding to the liquid crystal element, has also been proposed (for example, JP-A-9-230300). FIG. 16 shows a lateral cross-sectional view of the optical modulation element.

The optical modulation element 100 comprises two transparent substrates 110 and 120 substantially in parallel with each other and a liquid crystal layer 130 sandwiched between them, and on a liquid crystal side surface of the transparent substrate 110, a Fresnel lens-shaped concave-convex portion 140 having a concentric blaze shape is formed. Further, on liquid crystal side surfaces of each of the transparent substrates 110 and 120, an electrode 150 and an alignment film 160 are formed. Further, a liquid crystal layer 130 has an alignment direction substantially in parallel with the transparent substrates at a time of no electric field application, and the alignment direction is substantially perpendicular to the transparent substrates at a time of electric field application.

Here, by constituting a construction in which any one of ordinary refractive index $n_o$ or extraordinary refractive index $n_e$ of the liquid crystal layer 130 approximately equals to the refractive index $n_F$ of the concave-convex portion 140 of the transparent substrate having a blaze shape, a refractive index difference $\Delta n$ between the liquid crystal layer 130 and the concave-convex portion 140 changes from $\Delta n(=n_e-n_o)$ to zero for extraordinarily polarized incident light at a time of no electric field application and at a time of electric field application. Accordingly, by making the depth of the concave-convex portion 140 to be $\Delta n \times$(depth of concave-convex portion)=(wavelength of light in vacuum) and by making the refractive index $n_F$ of the concave-convex portion 140 substantially equal to $n_e$, for extraordinarily polarized incident light, the optical modulation element 100 functions as a liquid crystal lens element, whose off-state having no concave lens function at a time of no voltage application and whose on-state exhibiting concave lens function at a time of voltage application for extraordinarily polarized incident light, are switchable.

When the optical modulation element 100 is integrated with an objective lens for BD and employed in an optical head device, and the optical modulation element 100 is made to be in on-state only at a time of writing/reading a CD, a spherical aberration generated due to the difference of cover thicknesses of optical disks can be corrected and a concave lens function of expanding a working distance to be at least 0.3 mm is exhibited. Meanwhile, at a time of writing/reading a BD or a DVD, high transmittance can be obtained by making the optical modulation element 100 to be in off-state.

However, when ordinarily polarized light is incident into the optical modulation element 100 shown in FIG. 16, transmission wavefront changes according to the refractive index difference $\Delta n$ between the liquid crystal layer 130 and the concave-convex portion 140 regardless of the presence of applied voltage. Particularly, at a time of writing/reading a BD or a DVD, both of ordinarily polarized light and extraordinarily polarized light are incident into the optical modulation element 100, which deteriorates transmission wavefront aberration to cause a problem that writing/reading is prevented.

Further, heretofore, commonly used DVD optical disk has a single layer information recording layer and has a cover thickness of 0.6 mm (hereinafter referred to as "single layer DVD optical disk"). However, in recent years, in order to increase information amount in each optical disk, a (read only or readable and writable) optical disk having two information recording layers (hereinafter referred also to as "double layer DVD optical disk") has been developed, and in the double layer optical disk, information recording layers are formed at positions corresponding to light incident side cover thicknesses of 0.57 mm and 0.63 mm.

Also with respect to BD optical disk, besides a BD optical disk having a single information recording layer and having a cover thickness of 0.1 mm (hereinafter referred to as "single layer BD optical disk"), a double layer optical disk (hereinafter referred to as "double layer BD optical disk") has been developed to increase information amount in each optical disk, in which information recording layers are formed at positions corresponding to light incident side cover thicknesses of 0.100 mm and 0.075 mm.

Thus, in a case of employing an optical head device having an objective lens optimally designed to make zero aberration for a single layer optical disk (namely, a singe layer DVD optical disk or a single layer BD optical disk), to write/read to/from a double layer optical disk (namely, a double layer DVD optical disk or a double is layer BD optical disk), if their cover thicknesses are different, a spherical aberration is generated according to the difference in cover thicknesses, to deteriorate convergence of incident light into an information recording layer. Particularly, in a case of double layer optical disk of writable type, deterioration of convergent causes lowering of converging power density at a time of writing, which causes writing error, such being problematic.

To cope with this problem, as means for correcting a spherical aberration generated due to the difference of cover thicknesses of e.g. double layer optical disks, for example, an optical head device having a wavefront aberration correction means described in JP-A-10-269611 has been proposed. In this optical head device, as described in FIG. 2 of JP-A-10-269611, a segment liquid crystal panel is employed for correcting spherical aberration component generated according to the distance between recording layers of a multilayer disk.

However, in a case of correcting only spherical aberration component, if the liquid crystal panel is employed as it is disposed separately from an objective lens, misalignment between these elements occurs at a time of tracking operation of the objective lens, which causes a problem of coma aberration. In order to avoid such a problem, for example, it is considered to employ the liquid crystal panel integrally with the objective lens, but in such a construction, there has been a problem that load of an actuator for operating the objective lens increases and a voltage application system for the liquid crystal panel becomes complicated.

Further, in the same manner, for the purpose of correcting a spherical aberration generated due to the difference of cover thicknesses of e.g. double layer optical disks, an aberration correction device described in JP-A-2004-103058 has been proposed.

In this aberration correction device, as described in FIG. 2 of JP-A-2004-103058, an aberration correction unit is employed which comprises a hologram liquid crystal cell for rough adjustment which corrects large spherical aberration corresponding to the distance between recording layers of a multilayer optical disk, and a segment liquid crystal cell for fine adjustment which corrects spherical aberration corresponding to correlation error of cover layers. Here, the hologram liquid crystal cell constitutes a liquid crystal Fresnel lens comprising a glass substrate, another glass substrate having a saw-toothed-shaped cross-section, a liquid crystal sealed between these glass substrates and having a shape of diffraction grating whose cross-section has a saw-tooth-shaped blaze hologram shape, and transparent electrodes disposed on both sides of the liquid crystal for applying voltage to the liquid crystal. The electrodes are each made of non-divided uniform transparent conductive material.

However, in the case of this hologram liquid crystal cell, since the transparent electrode is formed on a surface of the glass substrate whose surface is fabricated into a saw-tooth shape, the transparent electrode tends to be broken, and thus, it has been difficult to produce stable and low-resistant transparent electrodes.

Further, in recent years, in order to improve recording density of an optical disk, an optical disk (hereinafter referred to as HDDVD optical disk or simply as "HD") having the same cover thickness as DVD 0.6 mm, has been developed, which uses an optical head device having a blue laser diode of 405 nm wavelength band and an objective lens having a NA of 0.65. However, since HDDVD and BD have different cover thicknesses, there has been a problem that writing/reading of HDDVD using an objective lens for BD or writing/reading of BD using an objective lens for HDDVD is not possible.

DISCLOSURE OF THE INVENTION

Problems to be Solved by the Invention

The present invention has been made considering the above-mentioned circumstances, and it is an object of the present invention to provide a liquid crystal lens element which does not produce transmission wavefront change in its off-state at a time of no voltage application regardless of polarization state of incident light, and which exhibits concave lens function in its on-state at a time of voltage application for extraordinarily polarized incident light. Further, it is another object of the present invention to provide an optical head device employing the liquid crystal lens element integrally with an objective lens optimally designed for BD, which realizes stable writing/reading to/from BD, DVD and CD.

Further, it is an object of the present invention to provide an optical head device employing the liquid crystal lens element, which can be small-sized element having no moving part, and which corrects spherical aberration generated due to the difference of cover thicknesses of single layer and double layer optical disks, to enable stable writing and/or reading.

Further, it is an object of the present invention to provide a BD/HDDVD compatible optical head device which is an objective head device having an objective lens for BD or an objective lens for HDDVD, and which can write/read optical disks of BD and HDDVD.

Means for Solving the Problems

The Present Invention Provides the Following Features:

1. A liquid crystal element comprising a pair of transparent substrates opposed to each other and a liquid crystal layer sandwiched between the transparent substrates, and configured to change a convergent point of light transmitted through the liquid crystal layer according to the magnitude of voltage applied to the liquid crystal layer; wherein the liquid crystal lens element comprises a Fresnel lens having a concave-convex portion formed on a flat surface of one of the transparent substrates opposed to the other transparent substrate and having a concave-convex shaped cross-section, a first transparent electrode formed on a flat surface under the Fresnel lens on said one of the transparent substrates on which the Fresnel lens is formed or on a surface of the concave-convex portion of the Fresnel lens, and a second transparent electrode formed on a flat surface of said the other transparent substrate opposed to said one of the transparent substrates; wherein substantial refractive index n(V) of the liquid crystal layer changes from a refractive index of off-state at a time of no voltage application (V=0) to a refractive index of on-state at a time of voltage application according to the magnitude of voltage V applied between the first transparent electrode and the second transparent electrode for extraordinarily polarized incident light, and the refractive index is ordinary refractive index $n_o$ for ordinarily polarized incident light regardless of the magnitude of applied voltage; and wherein the liquid crystal lens element satisfies any one of the following conditions (1) to (3):

(1) The liquid crystal layer is a nematic liquid crystal having a negative dielectric anisotropy in which alignment direction of liquid crystal molecules of the off-state is perpendicular or at an angle close to perpendicular to the surface of the Fresnel lens, and the Fresnel lens is made of a uniform refractive index material having a refractive index $n_F$ equal or close to the ordinary refractive index $n_o$ of the liquid crystal layer.

(2) The liquid crystal layer is a nematic liquid crystal having a positive dielectric anisotropy in which the alignment direction of liquid crystal molecules of the off-state is in parallel or close to parallel with the surface of the Fresnel lens, and the Fresnel lens is made of a birefringent material having an extraordinary refractive index $n_{Fe}$ equal or close to the extraordinary refractive index $n_e$ ($n_e \neq n_o$) of the liquid crystal layer and an ordinary refractive index $n_{Fo}$ ($n_{Fe} \neq n_{Fo}$) equal or close to the ordinary refractive index $n_o$ of the liquid crystal layer.

(3) The liquid crystal layer is a nematic liquid crystal having a positive dielectric anisotropy in which the alignment direction of liquid crystal molecules of the off-state is in parallel or close to parallel with the surface of the Fresnel lens, and the Fresnel lens is made of a uniform refractive index material having a refractive index equal or close to the extraordinary refractive index $n_e$ of the liquid crystal layer, and on said one of the pair of transparent substrates, a polarizing Fresnel lens is formed for canceling a phase difference generated between ordinarily polarized incident light into the liquid crystal lens element in the off-state and transmission light.

By constituting such a liquid crystal lens element, transmission wavefront of light incident into the liquid crystal lens element does not change regardless of polarization state of the incident light when the liquid crystal lens element is in off-state, but when the element is in on-state, transmission wavefront of extraordinarily polarized incident light changes, whereby it is possible to change focal lengths by switching the state of element between on-state and off-state. Here, "angle close to perpendicular" and "close to parallel" of "perpendicular or at an angle close to perpendicular" and "parallel or close to parallel" mean within 5 degrees from perpendicular angle and parallel state respectively. Further, "close to refractive index n" of "equal or close to refractive index n" means within 3% from the refractive index n.

2. The liquid crystal lens element according to the above 1, wherein a phase correction surface constituted by a plurality of steps is formed on at least one of the pair of transparent substrates, and the step height of each step corresponds to an optical path difference equal is or close to an integer times of a wavelength $\lambda_1$ and a wavelength $\lambda_3$, and correspond to an optical path difference of non-integer times of a wavelength $\lambda_2$, provided that $\lambda_1$, $\lambda_2$ and $\lambda_3$ ($\lambda_1 < \lambda_2 < \lambda_3$) are three different incident wavelengths.

By constituting such a liquid crystal lens element, the phase correction element exhibits aberration correction function only for incident light of wavelength $\lambda_2$ regardless of its polarization state when the element is in off-state. Here, "a value close to an integer times of wavelength" of "a value equal or close to an integer times of wavelength" means a value within 5% of a wavelength.

3. The present invention provides an optical head device comprising a light source, an objective lens for converging emission light from the light source on optical recording media having different cover layer thicknesses, and a photodetector for detecting light converged by the objective lens and reflected by an information recording layer of each of the optical recording media, wherein the liquid crystal lens element as defined in the above 1 or 2 is disposed in an optical path between the light source and the objective lens, the liquid crystal lens element having a function of correcting wavefront aberration for the optical recording media by changing transmission wavefront generated in the on-state and a concave lens function of expanding the distance between the objective lens and the optical recording medium.

By constituting such an optical head device, at a time of writing/reading plurality of optical disks having different cover thicknesses, it is possible to correct wavefront aberration generated due to the difference of cover thicknesses and to expand a working distance when the liquid crystal lens element is in on-state. As a result, it is possible to stably carry out writing/reading a plurality of types of optical disks by employing a single objective lens and a single liquid crystal lens element.

4. An optical head device comprising a light source for emitting light of wavelength λ, an objective lens for converging emission light from the light source on an optical recording medium, a beam splitter for splitting light converged by the objecting lens and reflected by the optical recording medium, and a photodetector for detecting the split light; wherein the optical recording medium has at least two information recording layers having different cover layer thicknesses, the liquid crystal lens element as defined in the above 1 is disposed in an optical path between the light source and the objective lens, and the optical head device is configured to carry out writing and/or reading to/from information recording layers having different cover layer thicknesses by switching applied voltage between applied voltage of off-state and applied voltage of on-state of the liquid crystal lens element.

5. The optical head device according to the above 4, wherein the liquid crystal lens element comprises a first liquid crystal lens element portion and a second liquid crystal lens element portion; the fist liquid crystal lens element portion and the second liquid crystal lens element portion each comprising a Fresnel lens having a concave-convex portion formed on a flat surface of said one of the transparent substrates opposed to the other substrate, having a cross-section of concave-convex shape and made of a uniform refractive index material having a refractive index equal or close to the ordinary refractive index $n_o$ of the liquid crystal layer, a first transparent electrode formed on a flat surface of said one of the transparent substrates on which the Fresnel lens is formed, and a second transparent electrode formed on a flat surface of said the other transparent substrate opposed to said one of the transparent substrates; wherein the liquid crystal layer is a nematic liquid crystal having negative dielectric anisotropy in which the alignment direction of liquid crystal molecules in the off-state is perpendicular or at an angle close to perpendicular to the surface of the Fresnel lens, and substantial refractive index n(V) of the liquid crystal layer changes between a refractive index of off-state at a time of no voltage application (V=0) and a refractive index of on-state at a time of voltage application for extraordinarily polarized incident light according to the magnitude of voltage V applied between the first transparent electrode and the second transparent electrode, and the substantial refractive index n(V) of the liquid crystal layer is the ordinary refractive index no regardless of the magnitude of applied voltage for ordinarily polarized incident light, and the directions of ordinary refractive index of the liquid crystal layers of the first liquid crystal lens portion and the second liquid crystal lens portion in on-state are perpendicular to each other.

By employing such an optical head device, regardless of polarization state of incident light, it is possible to stably write/read an optical disk having a plurality of information recording layers having different cover layer thicknesses.

Effects of the Invention

According to the present invention, when the liquid crystal lens element is in off-state at a time of no voltage application, the light is straightly transmitted through the liquid crystal lens element without having wavefront change and output regardless of polarization state of incident light, and thus, high transmittance is obtained. On the other hand, when the liquid crystal lens element is on-state at a time of voltage application, the liquid crystal lens element exhibits a lens function for extraordinarily polarized incident light. Accordingly, it is possible to switch presence and absence of lens function by switching on/off a voltage. Further, by constituting an optical head device having such a liquid crystal lens element, it is possible to realize writing/reading of optical disks for BD and DVD, using the liquid crystal lens element in off-state. Further, for CD, it is possible to achieve writing/reading, using the liquid crystal lens element in on-state so as to exhibit concave lens function to correct spherical aberration due to the difference of cover thickness and to expand a working distance to at least 0.3 mm.

Further, by constituting an optical head device having such a liquid crystal lens element, it is possible to effectively correct wavefront aberration due to the difference of cover thickness between a single layer optical disk and a double layer optical disk for BD or CD, which realizes stable writing/reading.

Further, by constituting an optical head device having such a liquid crystal lens element and an objective lens for BD or HDDVD, it is possible to realize a compatible optical head device for BD and HDDVD.

BRIEF DESCRIPTION OF THE DRAWINGS

FIGS. 8(A) to 8(C): Explanation views showing a function of the liquid crystal lens element of the second embodiment when applied voltage is changed, wherein FIG. 8(A) shows a transmission wavefront at an applied voltage $V_0$ having no wavefront change of wavelength $\lambda_1$, FIG. 8(B) shows a divergent transmission wavefront of wavelength $\lambda_2$ at an applied voltage $V_0$ and FIG. 8(C) shows a divergent transmission wavefront of wavelength $\lambda_3$ at an applied voltage $V_P$.

FIGS. 13(A) and 13(B): Construction views each showing a part of the optical head device employing the liquid crystal lens of the fourth embodiment according to the present invention.

FIG. 14: A graph showing calculated values of wavefront aberration performance of Example 3 of an optical head device employing the liquid crystal lens element according to the present invention and those of a conventional example.

EXPLANATION OF NUMERALS

Figure 1:
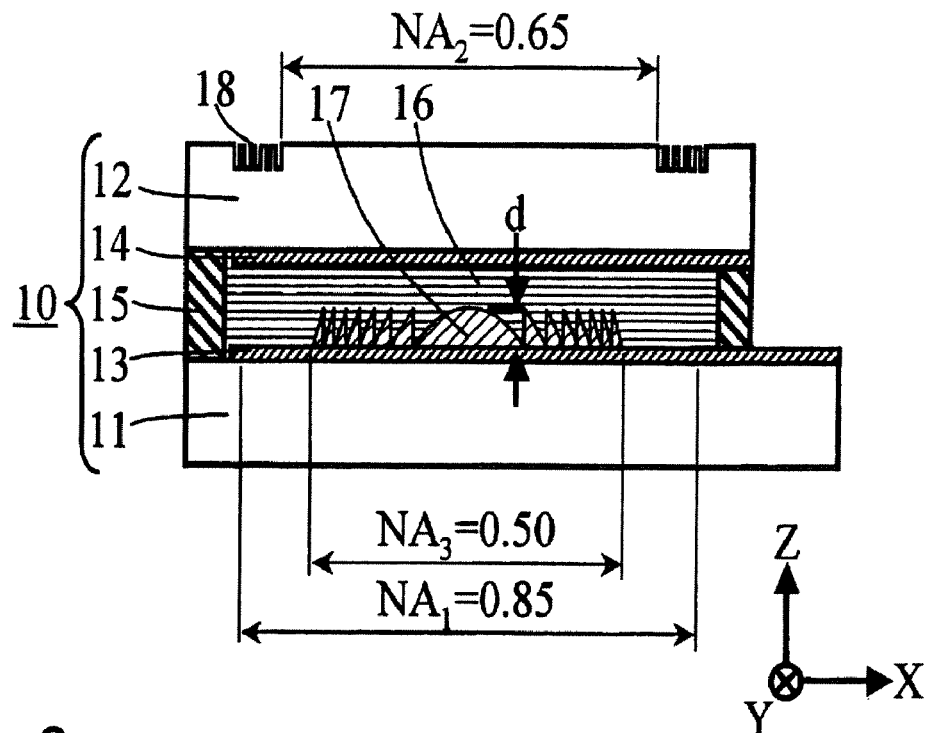
FIG. 1: A vertical cross-sectional view showing the construction of the liquid crystal lens element of the first embodiment according to the present invention.

1: Laser diode (light source)
2: Polarizing beam splitter
3: Wave-coupling prism
4: Collimator lens
5: Objective lens for BD
6: Photodetector
7: Actuator
8A: CD unit
8B: DVD unit
9: Wave-coupling prism
10, 20, 30: Liquid crystal lens element
11, 12, 12C, 12D, 21, 31, 310, 320: Transparent substrate
13, 13C, 13D: First transparent electrode
14, 14C, 14D: Second transparent electrode
15, 15C, 15D: Seal
16, 16C, 16D: Liquid crystal layer
17, 17C, 17D: Concave-convex portion (Fresnel lens)
18: Diffraction grating
19: Dielectric multilayer film
22: Polarizing Fresnel lens
23: Transparent adhesive agent
32: Phase correction surface
33: Phase plate
40: Optical head device
51: Quarter wavelength plate D: Optical disk
D1, D2: Information recording layer

BEST MODE FOR CARRYING OUT THE INVENTION

In the following, embodiments of the present invention are described with reference to attached drawings.

First Embodiment

An example of the construction of a liquid crystal lens element 10 according to the first embodiment of the present invention, is described in detail with reference to a side view shown in FIG. 1 and a plan view shown in FIG. 2.

The liquid crystal lens element 10 of this embodiment comprises transparent substrates 11 and 12, a first transparent electrode 13, a second transparent electrode 14, a seal 15, a liquid crystal layer 16, a concave-convex portion 17 and a diffraction grating 18.

Among these, the concave-convex portion 17 has a shape of a Fresnel lens or a Fresnel lens approximated by steps, and made of a transparent material of refractive index $n_F$ and formed in an effective diameter region corresponding to numerical aperture $NA_3=0.50$ for CD, and has a rotational symmetry about an optical axis (Z axis) of incident light. Meanwhile, the diffraction grating 18 is formed in a region including a numerical aperture $NA_1$ of BD except for a region of numerical aperture $NA_2$ for DVD, and has a rectangular cross-sectional shape having a grating depth producing a phase difference corresponding to one wavelength for a wavelength $\lambda_1=405$ nm for BD. By this construction, when light of wavelength $\lambda_1$ is incident into the diffracting grating 18, the light is straightly transmitted without being diffracted. On the other hand, when light of wavelength $\lambda_2=660$ nm and wavelength $\lambda_3=790$ nm are incident, most of the light is diffracted and the proportion of straightly transmitted light becomes at most 15%. Namely, a wavelength-selective numerical-aperture-limiting function is exhibited in which incident light of wavelength $\lambda_1$ is straightly transmitted through all region of numerical aperture $NA_1$ of the transparent substrate 12, incident light of wavelength $\lambda_2$ and wavelength $\lambda_3$ are straightly transmitted only through a region of numerical aperture $NA_2$.

Then, an example of the process for producing this liquid crystal lens element 10, is described as follows.

To begin with, on one of flat surfaces (an upper surface in FIG. 1) of the transparent substrate 11, a first transparent electrode 13 is formed. Further, a region of numerical aperture $NA_3$ on the transparent electrode 13, a concave-convex portion 17 is formed by using a transparent material of refractive index $n_F$.

Meanwhile, in a region including numerical aperture $NA_1=0.85$ except for a region of numerical aperture $NA_2=0.65$ on one of the surfaces (an upper surface in FIG. 1) of the transparent substrate 12, a diffraction grating 18 is formed. This diffraction grating 18 is, as described above, formed into a concave-convex grating of rectangular cross-sectional shape having a grating depth producing a phase difference corresponding to one wavelength of a wavelength $\lambda_1=405$ nm of BD. Here, on the surface of the transparent substrate 12 on which the diffraction grating 18 is formed, an antireflective film having reflectivities of at most 0.5% at wavelengths $\lambda_1$, $\lambda_2$ and $\lambda_3$, is formed.

Further, a second transparent electrode 14 is formed on the other surface of the transparent substrate 12, and thereafter, an adhesive agent, not shown, in which a gap control agent is mixed, is patterned by printing to form a seal 15. The transparent substrate 12 is overlapped with the above-mentioned transparent substrate 11, and press-bonded to form an empty cell.

Then, from an injection port (not shown) provided in a part of the seal 15, a nematic liquid crystal having an ordinary refractive index $n_o$ and an extraordinary refractive index $n_e$ (here, $n_o \neq n_e$) is injected, and thereafter, the injection port is sealed to seal the liquid crystal in the cell to form a liquid crystal layer 16, to constitute the liquid crystal lens element 10 of this embodiment.

Here, in this embodiment, in order to apply a voltage to the second transparent electrode 14 through an electrode 14A formed on the transparent substrate 11, conductive metal particles are mixed in the seal 15 in advance and the seal is press-bonded to provide conductivity in the thickness direction of the seal, to thereby provide conductivity between the second transparent electrode 14 and the electrode 14A. An electrode 13A connected with the first transparent electrode 13, and the electrode 14A connected with the second transparent electrode 14 are connected with external AC power source to apply AC voltage to the liquid crystal layer 16.

Thus, by applying AC voltage V to the first transparent electrode 13 and the second transparent electrode 14 of the liquid crystal lens element 10, alignment of liquid crystal molecules changes according to a voltage $V_{LC}$ applied to the liquid crystal layer 16, and substantial refractive index of the liquid crystal layer 16 changes. Here, "substantial refractive index" of the liquid crystal layer 16 means an average refractive index of the liquid crystal layer 16 in a polarization direction of incident light, which corresponds to (optical path)÷(depth of liquid crystal layer). As a result, for a specific linearly polarized incident light, substantial refractive index $n(V_{LC})$ of the liquid crystal layer 16 changes according to the magnitude of the voltage $V_{LC}$, and a wavefront of light transmitted through the liquid crystal lens element 10 changes.

When the electric specific resistance $\rho_F$ of the material of the concave-convex portion 17 is not sufficiently smaller than the electric specific resistance $\rho_{LC}$ of the liquid crystal layer 16, a voltage drop in the concave-convex portion 17 occurs from the applied voltage V between the first transparent electrode 13 and the second transparent electrode 14, and the voltage $V_{LC}$ effectively applied to the liquid crystal layer 16 lowers.

When the concave-convex portion 17 and the liquid crystal layer 16 have an electric specific resistance is large enough to be regarded as insulating materials, the applied voltage V is distributed according to the electric capacitance $C_F$ of the concave-convex portion 17 and the electric capacitance $C_{LC}$ of the liquid crystal layer 16, whereby the voltage $V_{LC}$ applied to the liquid crystal layer 16 is determined. Namely, the electric capacitances $C_F$ and $C_{LC}$ change according to the ratio of the thicknesses of the concave-convex portion 17 and the liquid crystal layer 16 sandwiched between the first transparent electrode 13 and the second transparent electrode 14, and thus, the voltage $V_{LC}$ and the refractive index $n(V_{LC})$ are distributed, and the average refractive index of a portion between the transparent electrodes 13 and 14, namely an optical path, can be adjusted according to the shape of the concave-convex portion 17. As a result, an applied voltage $V_P$ is present, at which transmission wavefront of incident light shows a power component (lens function) according to the Fresnel lens shape of the concave-convex portion 17. Accordingly, a liquid crystal lens element 10 whose convergent point of transmission light can be changed by switching an applied voltage, can be obtained.

Here, in order to obtain large change of substantial refractive index of the liquid crystal layer 16 in response to a voltage $V_{LC}$, alignment direction of molecules of the liquid crystal layer 16 is uniform at interfaces with the transparent substrates. In order to make alignment direction of liquid crystal molecules in a predetermined direction, alignment agent (not shown) of e.g. polyimide is preferably applied on surfaces of the second transparent electrode 14 and the concave-convex portion 17, cured and subjected to rubbing treatment in X axis direction.

Instead, polyimide may be used as the material for the concave-convex portion 17 and the surface may be subjected to rubbing treatment. Instead of rubbing treatment of polyimide, e.g. a SiO oblique vapor deposition film or light-alignment film may be used as an alignment agent to uniformly align liquid crystal molecules.

Here, in the concave-convex portion 17 of Fresnel lens shape made of a transparent material, the transparent material may be an organic material such as UV-curable resin, a thermosetting resin or photo-sensitive resin or may be an inorganic material such as $SiO_2$, $Al_2O_3$ or $SiO_xN_y$ (here, x and y represent element ratio of O and N). Further, the concave-convex portion 17 may be made of a uniform refractive index material or a birefringent material. The concave-convex portion 17 may be formed by forming a transparent material layer of predetermined thickness on a flat surface of the transparent substrate 11, and fabricating the transparent material layer into concave-convex shape by a technique such as photolithography or reactive ion etching, or may be formed by transferring the concave-convex shape to the transparent material layer by using a metal mold.

Here, in order to obtain a function that the transmission wavefront through the liquid crystal lens element 10 does not change (no power) for ordinarily polarized incident light (which has a polarization plane in which polarization direction is Y axis direction) when the liquid crystal lens element 10 is in off-state of no voltage application (V=0) between the first transparent electrode 13 and the second transparent electrode 14, the refractive index $n_F$ of the concave-convex portion 17 is made to be substantially equal to substantial refractive index $n(V_{LC}=0)$ of the liquid crystal layer 16.

Alignment direction of liquid crystal molecules of the liquid crystal layer 16 at a time of no voltage application, may, for example, be any one of the following three types.

(i) In a case of employing a liquid crystal having a negative dielectric anisotropy $\Delta\in(=\in_{//}-\in_\perp)$ being the difference between a specific dielectric constant $\in_{//}$ in the long axis direction of liquid crystal molecules and the specific dielectric constant $\in_{195}$ in a short axis direction of liquid crystal molecules, alignment direction (namely, the direction of extraordinary refractive index $n_e$) of the liquid crystal is uniformly in a direction perpendicular to an electric field generated by voltage application. In FIG. 1, on surfaces is of the concave-convex portion 17 and the second transparent electrode 14 are coated with an alignment film (not shown) such as polyimide which makes alignment direction of liquid crystal molecules substantially perpendicular to the surfaces, and the alignment film is cured and subjected to rubbing treatment in X axis direction. As a result, alignment of liquid crystal molecules at a time of no application becomes perpendicular alignment in which the liquid crystal molecules are aligned substantially in a perpendicular direction to the surfaces of the concave-convex portion 17 and the second transparent electrode 14. At this time, substantial refractive index $n(0)$ of the liquid crystal layer 16 becomes the ordinary refractive index $n_o$ for extraordinarily polarized incident light (which has a polarization plane in which polarization direction is X axis direction, the polarization plate is in X-Z plane), and the substantial refractive index n(0) approaches extraordinary refractive index $n_e$ as voltage $V_{LC}$ increases.

Figure 2:
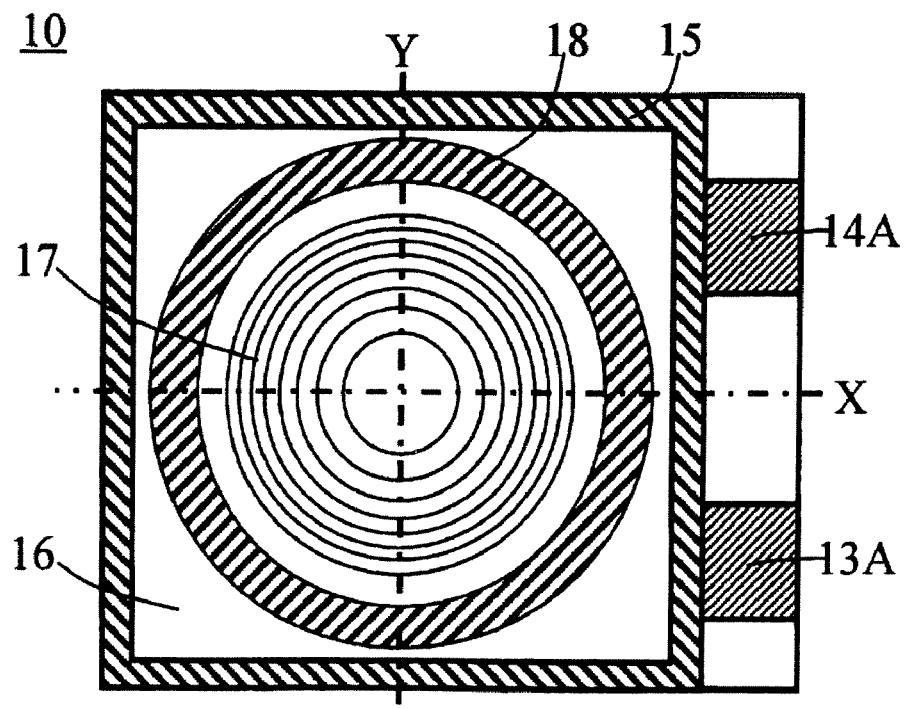
FIG. 2: A lateral cross-sectional view showing the construction of the liquid crystal lens element shown in FIG. 1.

(ii) A liquid crystal of positive dielectric anisotropy $\Delta\in$ is employed and horizontal alignment films are formed on surfaces of the second transparent electrode 14 and the concave-convex portion 17 in FIG. 1, so that the alignment direction of liquid crystal molecules is uniformly substantially in parallel with the surfaces of the concave-convex portion 17 and the second transparent electrode 14, to form homogeneous alignment in which alignment direction of liquid crystal molecules is uniformly in X axis direction. At this time, substantial refractive index n(0) of the liquid crystal layer 16 for extraordinarily polarized incident light becomes extraordinary refractive index $n_e$ of the liquid crystal, and approaches ordinary refractive index $n_o$ as voltage $V_{LC}$ increases.

(iii) A liquid crystal of positive dielectric anisotropy $\Delta\in$ is employed, and in FIG. 1, vertical alignment film is formed on the surface of the concave-convex portion 17. Meanwhile, on a surface of the flat second transparent electrode 14, a horizontal alignment film subjected to rubbing treatment in X axis direction is formed. As a result, a hybrid alignment is formed, in which alignment direction of liquid crystal molecules is uniformly substantially in vertical direction to the surface of the concave-convex portion 17, and is uniformly substantially in parallel with the surface of the second transparent electrode 14. At this time, substantial refractive index n(0) of the liquid crystal layer 16 for extraordinarily polarized incident light becomes an average value $(n_e+n_o)/2$ of extraordinary refractive index $n_e$ and ordinary refractive index $n_o$ of the liquid crystal, and approaches ordinary refractive index $n_o$ as the voltage $V_{LC}$ increases.

Then, cross-sectional shape of the concave-convex portion 17 of Fresnel lens shape or a Fresnel lens shape approximated by steps, is described in detail as follows.

The liquid crystal lens element 10 of the present invention is employed in an optical head device, and when the liquid crystal lens element is in on-state in which a voltage $V_P$ is applied between the first transparent electrode 13 and the second transparent electrode 14, the element produces transmission wavefront for correcting a spherical aberration generated due to the difference of cover thicknesses of optical disks, and produces transmission wavefront in which a negative power component (concave lens function) for expanding working distance. At this time, the liquid crystal lens element 10 is configured so that in a transmission wavefront of plane wave of extraordinarily polarized light incident into the liquid crystal lens 10, an optical path difference OPD of light beam passing a point a distance r distant in radial direction from the optical axis center (origin of coordinate: x=y=0), is represented by a power series shown in Formula (1).

$$OPD(r) = a_1 r^2 + a_2 r^4 + a_3 r^6 + a_4 r^8 + \quad (1)$$

wherein $r^2 = x^2 + y^2$ $a_1, a_2, \ldots$: constants (Coefficients of Table 1 are applied to the concave-convex portion 17, and coefficients of Table 2 are applied to the phase correction surface 32.)

TABLE 1

| Coefficient | Value |
| --- | --- |
| $a_1$ | −18.1374 |
| $a_2$ | −0.1392 |
| $a_3$ | 0.5976 |

TABLE 1-continued

| Coefficient | Value |
| --- | --- |
| $a_4$ | −0.3808 |
| $a_5$ | 0.0887 |

TABLE 2

| Coefficient | Value |
| --- | --- |
| $a_1$ | 3.4553 |
| $a_2$ | 1.0111 |
| $a_3$ | 0.1811 |
| $a_4$ | −0.0164 |
| $a_5$ | 0.0074 |

Figure 3:
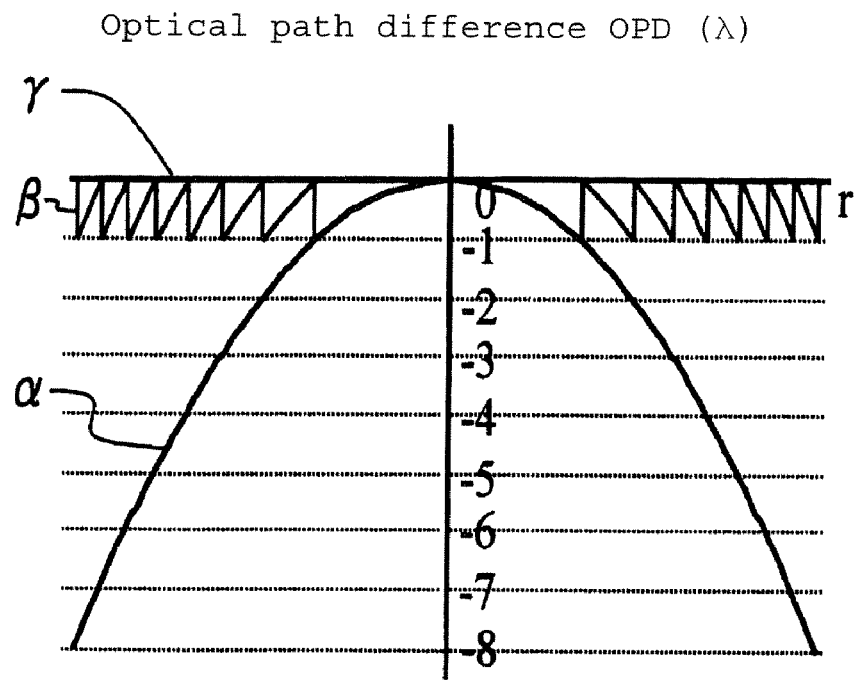
FIG. 3: A graph showing an optical path difference of transmission wavefront generated by the liquid crystal lens according to the first embodiment, wherein α indicates a graph showing an optical path difference in a unit of wavelength λ in relation to radial position r in horizontal axis, and β indicates a graph showing an optical path difference of at least −λ and at most zero produced by subtracting an integer times of wavelength λ from the optical path difference of α, and γ indicates a graph showing an optical path difference zero producing no transmission wavefront change.

Here, a specific example of the curve of Formula (1) is indicated by a symbol α in FIG. 3. Here, horizontal axis represents radial position r, and vertical axis represents optical path difference OPD in a unit of wavelength λ of incident light, and the graph of α shows a cross-section of Formula (1) including the central axis (r=0).

Since transmission wavefronts having an optical path difference of an integer times of wavelength λ of incident light to each other, can be regarded as equivalent, a graph β showing an optical path difference produced by slicing the graph (optical path difference) indicated by α of FIG. 3 at an interval of wavelength λ and projected (translated) on a surface of optical path difference zero, is substantially equivalent to the graph α. Meanwhile, the optical path difference represented by graph β is all within λ (in the Figure, within a range of from −λ to 0), and shows a Fresnel lens shape. This corresponds to the Fresnel lens shape of the concave-convex portion 17 in the liquid crystal lens element 10 shown in FIG. 1. Here, a graph indicated by γ in FIG. 3 shows a transmission wavefront having no transmission wavefront change and whose optical path difference is zero.

In the liquid crystal lens element 10 shown in FIG. 1, in a case where the relation between substantial refractive index $n(V_P)$ of the liquid crystal layer 16 and the refractive index $n_F$ of concave-convex portion 17 in on-state is $n(V_P) > n_F$, by forming the concave-convex portion 17 to have a Fresnel lens surface whose central portion is convex, concave lens function is exhibited. On the other hand, in a case of $n(V_P) < n_F$, by forming the concave-convex portion 17 to have a Fresnel lens shape whose central portion is convex and symmetric shape of the Fresnel lens in FIG. 1 with respect to XY plane, convex lens function is exhibited.

By the way, in a case where the concave-convex portion 17 and the liquid crystal 16 have electric specific resistances $\rho_F$ and $\rho_{LC}$ respectively large enough to be regarded as electric insulators, in an electric equivalent circuit, voltage distribution to the concave-convex portion 17 and to the liquid crystal layer 16 is decided according to the electric capacitances $C_F$ and $C_{LC}$ of the concave-convex portion 17 and the liquid crystal layer 16.

Figure 4:
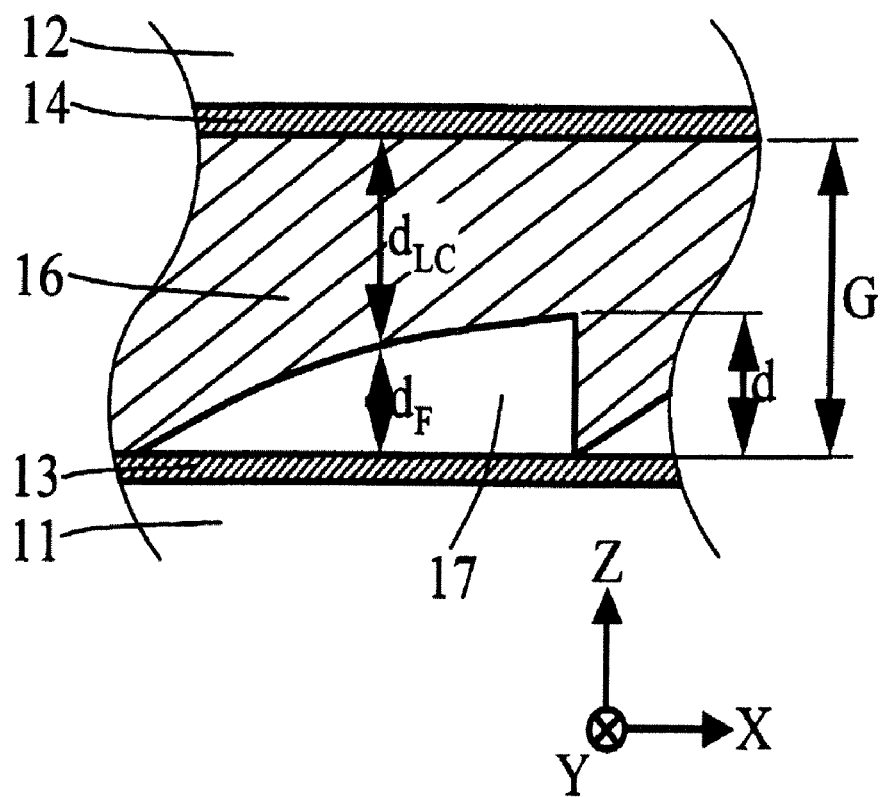
FIG. 4: An enlarged view of a portion between transparent electrodes in a side view of the liquid crystal lens element of the present invention.

For this reason, with respect to a case where $f \times \in_0 \times \rho_F \times \in_F$ and $f \times \in_0 \times \rho_{LC} \times \in_{LC}$ are each sufficiently larger than 1 provided that AC frequency of AC voltage V applied to the transparent electrodes is designated as f, specific dielectric constant of the concave-convex portion 17 is designated as $\in_F$, its film thickness is designated as $d_F$, specific dielectric constant of the liquid crystal of the liquid crystal layer 16 is designated as $\in_{LC}$ and its film thickness is designated as $d_{LC}$, the function of the liquid crystal lens element 10 is described with reference to FIG. 4 being an enlarged cross-sectional view of the first transparent electrode 13, the second transparent electrode 14, and the concave-convex portion 17 and the liquid crystal layer 16 between the first and second transparent electrodes. Here, $\epsilon_0$ is the dielectric constant of vacuum. Further, provided that the distance between the first transparent electrode 13 and the second transparent electrode 14 is designated as G, a sum ($d_F+d_{LC}$) of the film thickness $d_F$ of the concave-convex portion 17 and the layer thickness $d_{LC}$ of the liquid crystal 16 is a constant G.

The ratio $V_{LC}/V$ of the applied voltage $V_{LC}$ distributed to the liquid crystal layer 16 based on AC applied voltage V between the first transparent electrode 13 and the second transparent electrode 14, is represented by the following formula.

$$V_{LC}/V = C_F/(C_F + C_{LC}) \quad (2)$$
$$= 1/\{1 + (\varepsilon_{LC}/\varepsilon_F) \times (d_F/d_{LC})\}$$

Here, since the film thickness dF of the concave-convex portion 17 is distributed from zero to d according to the cross-sectional shape of saw-tooth shape or a saw-tooth shape approximated by steps forming a Fresnel lens, $d_F/d_{LC}$ is distributed from zero to d/(G−d). As a result, applied voltage $V_{LC}$ to the liquid crystal layer 16 is spatially distributed according to the shape of the concave-convex portion 17.

In order to apply a voltage efficiently to the liquid crystal layer 16, it is preferred to select a material having a large specific dielectric constant $\epsilon_F$ for the material of the concave-convex portion 17 so as to increase the ratio $V_{LC}/V$ of Formula (2). Since the specific dielectric constant $\epsilon_{LC}$ of the liquid crystal layer 16 is at least about 4, the concave-convex portion 17 preferably has a specific dielectric constant $\epsilon_F$ of at least 4.

Further, since a liquid crystal has dielectric anisotropy in which dielectric constant $\epsilon_{//}$ of liquid crystal molecules in a long axis direction and the specific dielectric constant $\epsilon_\perp$ in a short axis direction of liquid crystal molecules, are different, alignment of liquid crystal molecules changes according to voltage application and specific dielectric constant $\epsilon_{LC}$ of the liquid crystal layer 16 changes according to the alignment change of liquid crystal molecules. Accordingly, by reflecting change of specific dielectric constant $\epsilon_{LC}$ according to $V_{LC}$ in Formula (2), spatial distribution of the applied voltage $V_{LC}$ to the liquid crystal layer 16 is decided according to the shape of the concave-convex portion 17. Since $V_{LC}$ depends on the film thickness $d_F$, $V_{LC}$ is designated as $V_{LC}[d_F]$ from now on.

Here, $V_{LC}[0]$ equals to an applied voltage V between the transparent electrodes.

Accordingly, according to the distribution of the film thickness $d_F$ of the concave-convex portion 17, a spatial distribution of substantial refractive index $n(V_{LC}[d_F])$ of the liquid crystal layer 16 for extraordinarily polarized incident light, is formed. In FIG. 4, the optical path between the first transparent electrode 13 and the second transparent electrode 14 at a position where the film thickness of the concave-convex portion 17 is $d_F$, is $\{n_F \times d_F + n(V_{LC}[d_F]) \times d_{LC}\}$, and the optical path difference OPD with respect to the optical path $\{n_F \times d + n(V_{LC}[d]) \times (G−d)\}$ at a center position ($d_F$=d) of the Fresnel lens of the concave-convex portion 17, is represented by the Formula (3).

$$OPD = n_F \times (d_F - d) + n(V_{LC}[d_F]) \times (G - d_F) - n(V_{LC}[d]) \times (G - d) \quad (3)$$

Here, the film thickness $d_F$ is distributed from d to zero, and the optical path difference OPD is distributed from zero to the optical path difference $OPD_0$ of Formula (4).

$$OPD_0 = \{n(V) - n(V_{LC}[d])\} \times G - \{n_F - n(V_{LC}[d])\} \times d \quad (4)$$

For example, in order to produce an optical path difference of transmission wavefront corresponding to graph β of FIG. 3 for incident light of wavelength $\lambda_3$ for CD at an applied voltage $V_P$, it is sufficient that the film thickness d of the concave-convex portion 17 formed on the transparent substrate 11 and the distance G between the first transparent electrode 13 and the second transparent electrode 14 formed on the transparent substrate 11, are determined so that the optical path difference $OPD_0$ becomes substantially $\lambda_3$, and that the concave-convex portion 17 is formed to have a cross-sectional shape in which film thickness is from zero to d. In this embodiment, the concave-convex portion 17 is fabricated into a Fresnel lens shape so that the optical path difference $OPD_0$ becomes substantially equal to the wavelength $\lambda_3$ of CD, namely, from 0.75 $\lambda_3$ to 1.25 $\lambda_3$.

Here, at an applied voltage $V_0$(=0) and $V_P$ corresponding to off-state and on-state respectively, plane wave of extraordinarily polarized light incident is into the liquid crystal lens 10 is transformed into a transmission wavefront represented by graphs γ and β respectively of FIG. 3, to be output. Namely, according to an applied voltage between the first transparent electrode 13 and the second transparent electrode 14, lens functions corresponding to off-state producing no power and on-state producing negative power, can be obtained.

On the other hand, when the linearly polarized incident light into the liquid crystal lens element 10 is ordinarily polarized light, in any cases of the above vertical alignment, homogeneous alignment and hybrid alignment, substantial refractive index of the liquid crystal layer 16 becomes constantly the ordinary refractive index $n_o$ regardless of the magnitude of applied voltage V. At this time, an optical path difference OPD represented by Formula (3) becomes $\{(n_o - n_F) \times (d - d_F)\}$, and when $(n_o - n_F)$ is not zero, transmission wavefront through the liquid crystal lens element 10 changes according to the distribution of the film thickness $d_F$ of the concave-convex portion 17. In order to satisfy a condition that the liquid crystal lens element 10 has no power when it is off-state (V=$V_{LC}[d_F]$=$V_{LC}[d]$=0) for extraordinarily polarized incident light, the refractive index $n_F$ of the concave-convex portion 17 for extraordinarily polarized light needs to be $n_F$=n(0) according to formula (3), and thus, the liquid crystal lens element 10 is configured so that $n_F$=$n_o$ when the liquid crystal layer 16 is vertical alignment, $n_F$=$n_e$ when it has homogeneous alignment and $n_F$=$(n_o+n_e)/2$ when it has hybrid alignment.

Accordingly, in a case where the concave-convex portion 17 is made of a uniform refractive index material, when the liquid crystal layer 16 has vertical alignment, $(n_o−n_F)$ becomes zero for ordinarily polarized incident light, but when the liquid crystal layer 16 has homogeneous alignment and hybrid alignment, $(n_o−n_F)$ becomes $(n_o−n_e)$ and $(n_o−n_e)/2$ respectively, and transmission wavefront changes according to the distribution of optical path difference OPD.

In order to prevent generation of such a fixed spatial distribution of the optical path difference OPD for ordinarily polarized incident light, the liquid crystal lens element 10 preferably has the following construction.

A first construction is such that a birefringent material such as a polymer liquid crystal is employed for the transparent material of the concave-convex portion 17, and the material is adjusted so that the refractive index of the liquid crystal layer 16 and the refractive index of the concave-convex portion 17 become equal for extraordinarily polarized light and ordinarily polarized light when the liquid crystal lens element is off-state. Specifically, a birefringent material is selected so that the refractive index $n_{Fe}$ of the concave-convex portion 17 for extraordinarily polarized light equals to substantial refractive index $n(0)$ of the liquid crystal layer 16 when the element in off-state, and the refractive index $n_{Fo}$ of the concave-convex portion 17 for ordinarily polarized light equals to the ordinary refractive index $n_o$ of the liquid crystal layer 16, so that the element has a construction that spatial distribution of optical path difference OPD is not generated regardless of polarization state of incident light. For example, in a case of concave-convex portion 17 made of polymer liquid crystal, it is sufficient that ordinary refractive index $n_{Fo}$ and extraordinary refractive index $n_{Fe}$ of the polymer liquid crystal is made to be equal to the ordinary refractive index $n_o$ and extraordinary refractive index $n_e$ respectively of the liquid crystal of the liquid crystal layer 16 having homogeneous alignment, so that the polymer liquid crystal is aligned in the same direction as the alignment direction of liquid crystal molecules of the liquid crystal layer 16 at the interface with the concave-convex portion 17.

Figure 5:
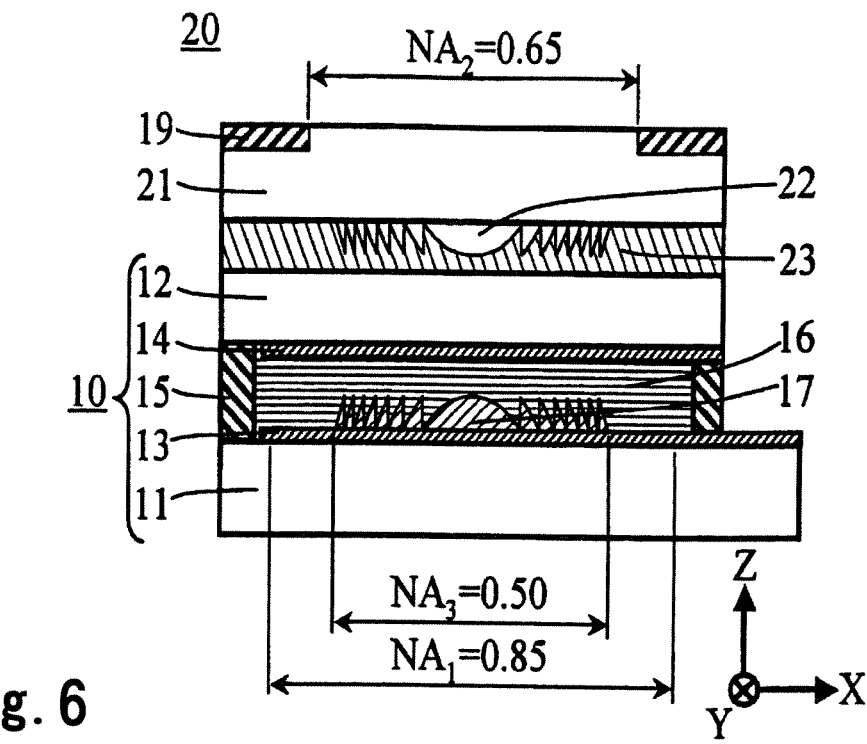
FIG. 5: A vertical cross-sectional view showing the construction of another liquid crystal lens element of the first embodiment according to the present invention.

Then, as a second construction, (modified example of the liquid crystal lens element 10 of FIG. 1), FIG. 5 shows a cross-sectional view of a liquid crystal lens element 20. In the liquid crystal lens element 20, in order to cancel fixed optical path difference OPD of the liquid crystal lens element 10 generated for ordinarily polarized incident light, a polarizing Fresnel lens 22 made of a birefringent material is formed on the transparent substrate 21, as a polarizing phase correction layer.

Here, first of all, a process for producing the transparent substrate 21 and the polarizing Fresnel lens 22 is described. Namely, an alignment film subjected to alignment treatment is formed on one surface (lower side in FIG. 5) of the transparent substrate 21, and a polymer liquid crystal film whose molecules are uniformly aligned in Y axis direction, if formed. The polymer liquid crystal film is fabricated into a Fresnel lens shape constituted by a concave-convex portion, and the concave portions are filled with a transparent adhesive agent 23 having a uniform refractive index $n_s$ equal to the ordinary refractive index $n_{Fo}$ of the polymer liquid crystal, and the Fresnel lens-shaped concave-convex portion is bonded and fixed to the transparent substrate 12. Here, the alignment direction of the polymer liquid crystal and the alignment direction of the liquid crystal of the liquid crystal layer 16 in off-state, are perpendicular to each other, and with respect to a polarization plane (in X-Z plane) of light polarized in X axis direction being extraordinarily polarized light for the liquid crystal layer 16, the ordinary refractive index $n_{Fo}$ of the polymer liquid crystal and the refractive index $n_s$ of the transparent adhesive agent 23 are equal to each other, and thus, transmission wavefront through the polarizing Fresnel lens 22 does not change. On the other hand, the polarization direction of ordinarily polarized light for the liquid crystal layer 16 is Y axis direction, and in this polarization plane, extraordinary refractive index $n_{Fe}$ of the polymer liquid crystal and the refractive index $n_s$ of the transparent adhesive agent 23 are different from each other, and thus, transmission wavefront through the polarizing Fresnel lens 22 is changed according to the Fresnel lens shape of the concave-convex portion. When the concave-convex shape of the polymer liquid crystal is decided so that the transmission wavefront change cancels the fixed optical path difference OPD generated for ordinarily polarized incident light into the liquid crystal lens element 10, transmission wavefront does not change regardless of polarization state of incident light in off-state, such being preferred. As compared with the first construction, the second construction has such merits that refractive indexes $n_{Fe}$ and $n_{Fe}$ of the polymer liquid crystal are not limited depending on the extraordinary refractive index $n_e$ and the ordinary refractive index $n_e$ of the liquid crystal, and thus, the material can be selected flexibly. On the other hand, the second construction has such a demerit that forming of the polarizing Fresnel lens 22 makes the liquid crystal lens element thick.

Further, in the liquid crystal lens 20 of FIG. 5, instead of the diffraction grating 18 of the liquid crystal lens 10, a dielectric multilayer film filter 19 is formed in a predetermined region of one surface of the transparent substrate 21, to exhibit aperture limiting function. The dielectric multilayer film filter 19 transmits light of wavelength $\lambda_1$ and reflects light of wavelength $\lambda_2$ and wavelength $\lambda_3$. Here, elements in FIG. 5 having the same reference numerals indicate the same elements as those of FIG. 1.

As described above, the liquid crystal lens elements 10 and 20 of FIG. 1 and FIG. 5, each has a construction that the first transparent electrode 13 is formed on a flat surface of the transparent substrate 11, and on the first transparent electrode 13, a Fresnel lens constituted by the concave-convex portion 17 is formed. However, the construction may be such that the Fresnel lens constituted by the concave-convex portion 17 is formed on the flat surface of the transparent substrate 11, and the first transparent electrode 13 is formed on the surface of the concave-convex portion 17.

In this case, a voltage V applied between the first transparent electrode 13 and the second transparent electrode 14, are directly applied to the liquid crystal layer 16 without being dropped by the concave-convex portion 17, and thus, substantial refractive index $n(V)$ of the liquid crystal 16 becomes uniform regardless of the film thickness $d_F$ of the concave-convex portion 17. Accordingly, at a position where the concave-convex portion 17 has a film thickness $d_F$, the optical path between the first transparent electrode 13 and the second transparent electrode 14 is $\{n_F \times d_F + n(V) \times d_{LC}\}$, and the optical path difference OPD with respect to the optical path $\{n_F \times d + n(V) \times (G-d)\}$ at a Fresnel lens center position ($d_F$=d) of the concave-convex portion 17, is represented by the Formula (5).

$$OPD = \{n_F \times d_F + n(V) \times d_{LC}\} - \{n_F \times d + n(V) \times (G-d)\} \quad (5)$$
$$= \{n(V) - n_F\} \times (d - d_F)$$

Here, the film thickness $d_F$ is distributed from d to zero, the optical path difference OPD represented by Formula (5) is distributed from zero to $\{n(V)-n_F\} \times d$. Accordingly, at an applied voltage $V_P$, in order to produce an optical path difference of transmission wavefront corresponding to graph β of FIG. 3 for incident light of CD wavelength $\lambda_3$, the film thickness d of the concave-convex portion 17 is determined so that the optical path difference $\{n(V_P)-n_F\} \times d$ becomes substantially $\lambda_3$ (namely, from 0.75 $\lambda_3$ to 1.25 $\lambda_3$), and the concave-convex portion 17 is formed to have a cross-section in which the film thickness distributes from zero to d.

In the construction that the first transparent electrode 13 is formed on the surface of the concave-convex portion 17, applied voltage $V_{LC}$ to the liquid crystal layer 16 equals to an applied voltage V between the first transparent electrode 13 and the second transparent electrode 14 regardless of the material property of the concave-convex portion 17 such as specific dielectric constant or electric specific resistance, or its shape. Accordingly, design of the shape of the concave-convex portion 17 of the Fresnel lens is easy, but it is difficult to stably form the first transparent electrode 13 on the surface of the concave-convex portion 17 without breakage and with low resistance. On the other hand, in the construction that the first transparent electrode 13 is formed underneath the concave-convex portion 17, applied voltage $V_{LC}$ to the liquid crystal layer 16 decreases as the film thickness dF of the concave-convex portion 17 increases, and substantial refractive index $n(V_{LC}[d_F])$ of the liquid crystal layer 16 is distributed accordingly. As a result, it is possible to obtain a large optical path difference by the concave-convex portion 17 having relatively thin film thickness d, and thus, there is a merit that film forming of the concave-convex portion 17 and its fabrication process can be simple.

In the liquid crystal lens element 10 or 20 thus obtained, in its off state ($V=V_{LC}[d_F]=0$), incident light is straightly transmitted through the liquid crystal lens is element regardless of its polarization state and wavelength without having transmission wavefront change (namely, no power is provided), and thus, high transmittance is obtained. Further, when the element is on-state ($V=V_P$), extraordinarily polarized incident light of wavelength $\lambda_3$ is transmitted with divergent transmission wavefront corresponding to concave lens (namely, negative power component). Here, ordinarily polarized incident light is straightly transmitted without having transmission wavefront change (namely, no power) regardless of applied voltage and wavelength, and thus, high transmittance is obtained.

Accordingly, when a light flux of wavelength $\lambda_1$ for BD is incident into the liquid crystal lens element 10 or 20, by setting the applied voltage V to zero (namely, off state), the light flux is straightly transmitted scarcely having light loss in a region of numerical aperture $NA_1$. Further, in a case where a light flux of wavelength $\lambda_2$ for DVD is incident, at an applied voltage V of zero, the light flux is straightly transmitted scarcely having light loss in a region of numerical aperture $NA_2$. On the other hand, when a light flux of extraordinarily polarized light of wavelength $\lambda_3$ for CD is incident, by setting an applied voltage V to be $V_P$ (namely, on-state), the light flux is transmitted with divergent wavefront corresponding to concave lens function in a region of numerical aperture $NA_3$.

Further, in this embodiment, with respect to the case of liquid crystal lens element producing an optical path difference OPD symmetric about an axis represented by formula (1), its element structure and operation principle are described. However, a liquid crystal element producing an optical path difference OPD corresponding to correction of non-axis-symmetric aberration such as coma aberration or astigmatism besides the aberration represented by formula (1), can also be produced by fabricating the concave-convex portion 17 and filling its concave portions with a liquid crystal in the same principle.

Further, in this embodiment, the construction is shown in which the first transparent electrode 13 and the second transparent electrode 14 that are one piece electrodes, are employed to apply AC voltage to the liquid crystal layer 16. However, besides this construction, the construction may be such that at least one of the first transparent electrode 13 and the second transparent electrode 14, is spatially divided into segments so that different AC voltages can be applied independently to the respective segments. Further, the spatially divided transparent electrode may be a register film having a desired electric resistance, and at least two power supply points are provided to form an applied voltage distribution in a radial direction, so that the voltage applied to the liquid crystal is distributed in a is slope shape in the radial direction. By constructing such a construction employing the divisional electrodes or resistant film electrode, further various spatial distribution of optical path difference OPD can be produced.

Further, by laminating a liquid crystal lens element exhibiting concave lens function for linearly polarized light polarized in X axis direction and a liquid crystal lens element exhibiting concave lens function for linearly polarized light polarized in Y axis direction, concave lens function is exhibited in a region of numerical aperture $NA_3$ when the element is on-state regardless of polarization state of incident light of wavelength $\lambda_3$ for CD. Specifically, it is sufficient that liquid crystal lens elements 10 are laminated so that alignment directions of liquid crystal molecules of the respective liquid crystal layers 16 are perpendicular to each other. In a case of employing concave-convex portions 17 made of a birefringent material such as a polymer liquid crystal, optical axis directions of the birefringent materials of the concave-convex portions 17 are also made to be perpendicular to each other. Further, in a case of employing a liquid crystal layer 16 made of a liquid crystal of positive dielectric anisotropy $\Delta\in$ and concave-convex portion 17 made of a uniform refractive index material, in order to cancel a fixed optical path difference OPD generated regardless of incident polarization, a Fresnel lens for phase correction may be formed on a surface of the transparent substrate of the liquid crystal lens element.

Second Embodiment

An example of the construction of a liquid crystal lens element 30 according to the second embodiment of the present invention, is described in detail with reference to a side view shown in FIG. 6. Here, in this embodiment, the same portions as those of the first embodiment are designated as the same reference numerals to avoid duplication of explanation.

In the liquid crystal lens element 30 of this embodiment, differently from the first embodiment, in order to correct spherical aberration generated due to the difference of cover thickness at a time of writing/reading a DVD using an object lens for BD, a phase correction surface 32 for DVD is formed in a region corresponding to a numerical aperture $NA_2=0.65$ on the surface of the transparent substrate 31. Further, the liquid crystal lens 30 of this embodiment is different from the liquid crystal lenses 10 and 20 of the first embodiment in that a phase plate 33 is sandwiched between a transparent substrate 31 and a transparent substrate 12. Here, reference numerals of FIG. 6 in common with those of FIG. 1 indicate the same elements of those of FIG. 1.

In a case of using an objective lens for BD having a numerical aperture $NA_2=0.65$ to converge incident light of wavelength $\lambda_2=660$ nm on an information recording layer of DVD, a large spherical aberration is generated. In this case, by using a phase correction element (refer to e.g. JP-A-2004-138895), it is possible to correct such a spherical aberration to achieve stable writing/reading of a DVD optical disk.

For this purpose, the phase correction surface 32 for DVD of this embodiment, formed in a region of numerical aperture $NA_2$, is constituted by a step-shaped concave-convex portion having a rotational symmetry about an optical axis of incident light, and the phase difference of transmission light of wavelength $\lambda_1$ produced by one step of the concave-convex portion is an even number times of $2\pi$.

Here, provided that the phase difference of transmission light produced by each step of the concave-convex portion of the phase correction surface 32 made of a transparent material of uniform refractive index n, is an even number times of $2\pi$ of wavelength $\lambda_1$, the phase difference for a wavelength $\lambda_3$ becomes about an integer times of $2\pi$ considering refractive index wavelength dispersion of the material of concave-convex portion. Accordingly, light of wavelength $\lambda_1$ and wavelength $\lambda_3$ is straightly transmitted without change of transmission wavefront through the concave-convex portion of the phase correction surface 32 regardless of polarization state of the incident light. On the other hand, for incident light of wavelength $\lambda_2$, the phase difference of the concave-convex portion of the phase correction surface 32 becomes non-integer times of $2\pi$, and the phase correction surface 32 becomes a wavelength-selective phase correction surface which changes transmission wavefront according to the shape of the concave-convex portion.

The cross-sectional shape of the concave-convex portion of the phase correction surface 32 is determined so as to produce a transmission wavefront of an optical path difference OPD represented by formula (1) for correcting a spherical aberration of DVD generated due to the difference of cover thickness of optical disk. Here, in order to change a working distance to a DVD optical disk, the transmission wavefront may be a transmission wavefront having a power component. In this case, the phase correction surface 32 becomes a Fresnel lens shape whose cross section is a saw-tooth shape in which concave portions are approximated by a step-shaped grating.

The phase correction surface 32 is, for example, a concave-convex shape of a step-shaped grating producing a transmission wavefront corresponding to graph β representing an optical path difference produced by slicing a graph (optical path difference) indicted by α of FIG. 3 at an interval of wavelength $\lambda_2$ and projecting (translating) the sliced graph on a plane of optical path difference zero. Here, the phase correction surface 32 is formed so that an optical path difference $(n-1) \times d_1$ corresponding to a height $d_1$ of one step produced by equally dividing the height $d_N$ of a step-shaped grating of (N+1) levels (namely, N steps), by N, becomes an even number times of wavelength $\lambda_1$=405 nm. For example, when light of wavelength $\lambda_2$ is incident into the phase correction surface 32 satisfying $(n-1) \times d_1 = 2 \times \lambda_1$, the phase difference of transmission wavefront corresponding to one step of the concave-convex portion becomes $2\pi \times (n-1) \times d_1/\lambda_2 = 2\pi \times (2 \times \lambda_1/\lambda_2)$, and considering the refractive index wavelength dispersion of the transparent substrate 31, the phase difference becomes about $2\pi \times 1.18$. Namely, a transmission wavefront effectively delays by 0.18 wavelength per each step of the step-shaped grating. Accordingly, by approximating the cross section of saw-tooth shape by a step-shaped grating of N=4 or N=5, a phase correction surface 32 for correcting only a transmission wavefront for DVD is constructed.

Figure 7:
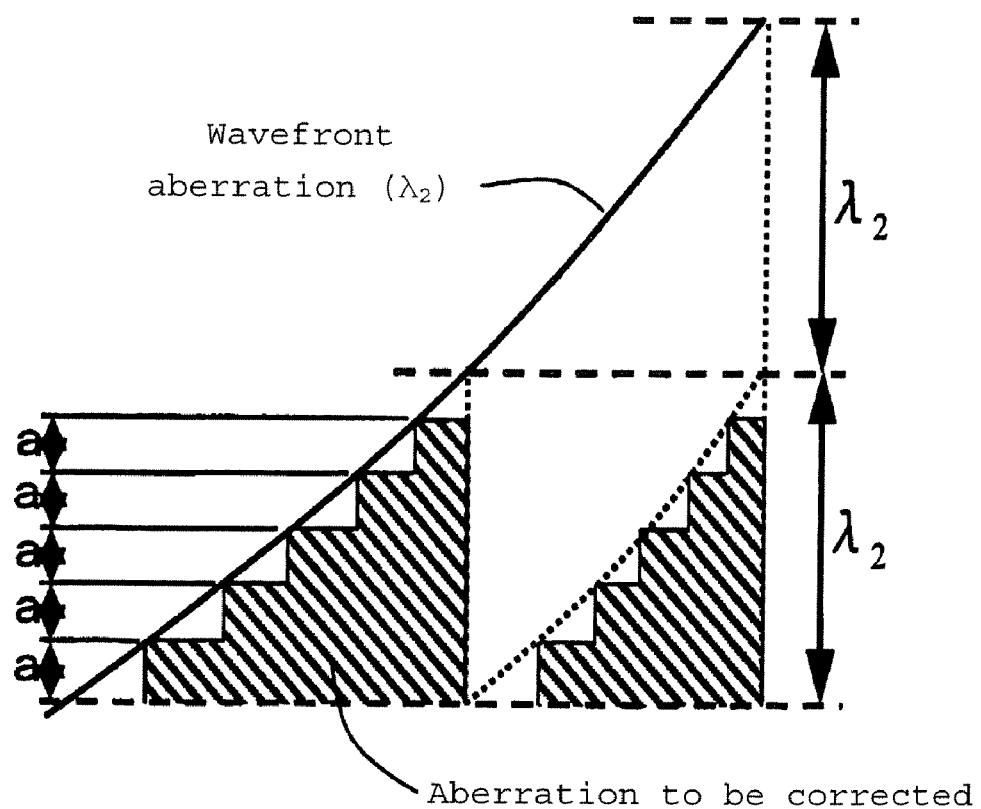
FIG. 7: A partial enlarged view of a wavefront aberration showing wavefront aberration correction function of a phase correction surface for DVD of the liquid crystal lens element of the second embodiment according to the present invention.

Here, a partial enlarged view of wavefront aberration showing wavefront aberration correction function of the phase correction surface 32, is shown in FIG. 7. Using a correction optical path difference $a = \{(n-1) \times d_1 - \lambda_2\}$ corresponding to the height $d_1$ of one step of the step-shaped grating as a unit, a wavefront aberration corresponding to one wavelength $\lambda_2$ is sliced at an interval of the correction optical path difference a, to approximately correct the wavefront aberration. FIG. 7 shows an example of aberration correction by a step-shaped grating of 6 levels (5 steps).

Figure 6:
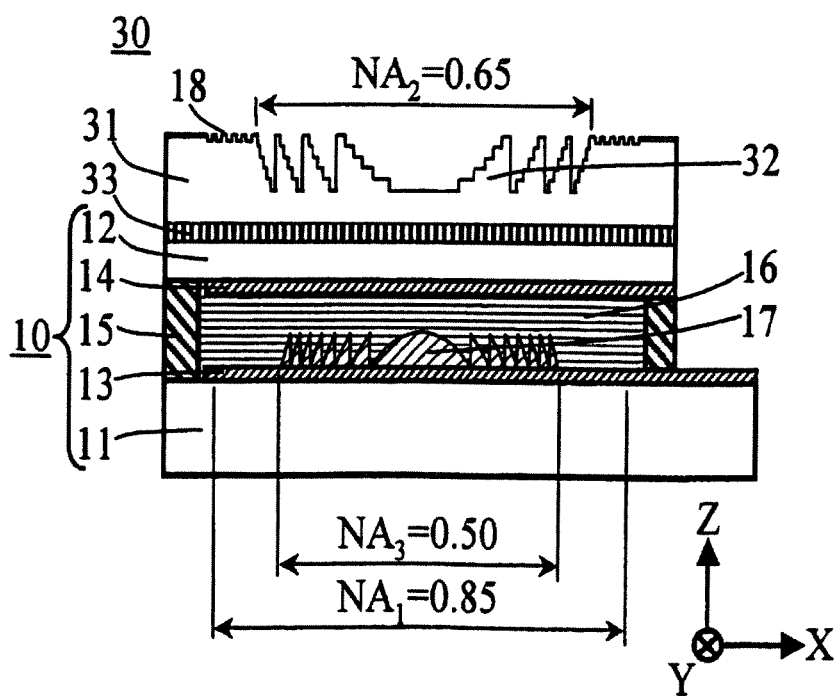
FIG. 6: A vertical cross-sectional view showing the construction of the liquid crystal lens element of a second embodiment according to the present invention.

Then, with reference to FIG. 6, a phase plate 33 sandwiched between the transparent substrate 31 and the transparent substrate 12 is described.

A polyimide alignment film subjected to alignment treatment in a direction at an angle of 45° to X axis is formed on a surface of the transparent substrate 31, a liquid crystal monomer is applied and polymerized to be cured, to form a phase plate 33 made of a polymer liquid crystal in which molecular alignment is uniformly in the alignment treatment direction. Further, by using a transparent adhesive agent (not shown), the phase plate 33 is bonded and fixed to the transparent substrate 12. Here, when the film thickness of the polymer liquid crystal material is determined considering the refractive index wavelength dispersion, and when phase plate 33 is constructed so that its retardation value Rd becomes $9\lambda_1/4$ at wavelength $\lambda_1$, Rd becomes about $5\lambda_2/4$ at wavelength $\lambda_2$, and Rd becomes about $\lambda_3$ at wavelength $\lambda_3$. Namely, the phase plate 33 becomes a quarter waveplate for wavelengths $\lambda_1$ and $\lambda_2$ and does not function as a waveplate for wavelength $\lambda_3$.

FIG. 8 shows transmission light through the liquid crystal lens element 30 thus obtained, when linearly polarized light polarized in X axis direction (extraordinary light) or in Y direction (ordinary light) is incident into the liquid crystal lens element 30.

Light flux of wavelength $\lambda_1$ for BD incident into a region of numerical aperture of $NA_1$ is transformed into circularly polarized light and is straightly transmitted without having transmission wavefront change when the element is off-state ($V=V_0=0$) as shown in FIG. 8(A). Further, light flux of wavelength $\lambda_2$ for DVD incident into a region of numerical aperture $NA_2$, is transformed into circularly polarized light having a divergent wavefront by the phase correction surface 32, and is transmitted as shown in FIG. 8(B). Further, when linearly polarized light polarized in X axis direction is incident when the element is on-state ($V=V_P$), light flux of wavelength $\lambda_3$ for CD incident into a region of numerical aperture $NA_3$, remains linearly polarized light polarized in X axis direction but its wavefront is changed to a divergent wavefront by the Fresnel lens constituted by the concave-convex portion 17 and the liquid crystal layer 16, and is transmitted as shown in FIG. 8(C).

Here, by laminating two or three layers of phase plates made of a polymer liquid crystal having different retardation values and different slow phase axis directions, it is possible to constitute a phase plate 33 corresponding to substantially a quarter waveplate for wavelengths $\lambda_1$, $\lambda_2$ and $\lambda_3$. In this case, in order to exhibit a concave lens function in a region of numerical aperture $NA_3$ in on-state regardless of polarization state of incident light of wavelength $\lambda_3$ for CD, the construction is preferably such that a liquid crystal lens element exhibiting a concave lens function for linearly polarized light polarized in X axis direction and a liquid crystal lens element exhibiting a concave lens function for linearly polarized light polarized in Y axis direction, are laminated.

Embodiment 3

Then, a three-wavelength-compatible optical head device 40 to be used for writing/reading three types of optical disks that are BD, DVD and CD, employing the liquid crystal lens element 30 (refer to FIG. 6) according to the second embodiment of the present invention, is described with reference to FIG. 9.

The optical head device 40 of this embodiment has a construction that the device comprises a laser diode 1 as a light source of wavelength $\lambda_1$=405 nm for BD, a polarizing beam splitter 2, a wave-coupling prism 3, a collimator lens 4, an objective lens 5 for BD, a photodetector 6 of wavelength $\lambda_1$, and further, the liquid crystal lens element 30 integrated with an actuator 7 for holding the objective lens 5.

Further, the optical head device 40 of this embodiment comprises a DVD unit 8A, not shown, in which a laser diode as a light source of wavelength $\lambda_2$=660 nm for DVD, a photodetector of wavelength $\lambda_2$ and a beam splitter are integrated, a CD unit 8B, not shown, in which a laser diode as a light source of wavelength $\lambda_3$=790 nm for CD, a photodetector of wavelength $\lambda_3$ and a beam splitter are integrated, and a beam splitter 9.

Then, the function of this embodiment is described.

(I) Light of wavelength $\lambda_1$=405 nm emitted from a laser diode 1 is reflected by a polarizing beam splitter 2, transmitted through a wave-coupling prism 3, transformed into parallel light by a collimator lens 4, incident into the liquid crystal lens element 30 in off-state as ordinarily polarized light (having a polarization plane in which the polarization plane is Y axis direction). Further, the light is transformed into circularly polarized light by a phase plate 33 (refer to FIG. 6) in the liquid crystal lens element 30, straightly transmitted through the liquid crystal lens element 30 as shown in FIG. 8(A), and a light flux corresponding to a numerical aperture $NA_1$=0.85 is converged on an information recording layer of an optical disk D for BD by an objective lens 5 for BD. Meanwhile, signal light reflected by the information recording layer is returned through the same optical path as it comes out, transformed into extraordinarily polarized light (having a polarized plane in which the polarization direction is X axis direction) by the phase plate 33 in the liquid crystal lens element 30, straightly transmitted through the liquid crystal lens element 30, transmitted through the wave-coupling prism 3 and the polarizing beam splitter 2, and efficiently converged on a photo-receiving plane of a photodetector 6, to be transformed into electrical signal.

(II) Further, light of wavelength $\lambda_2$=660 nm emitted from the DVD unit 8A, is transmitted through the wave-coupling prism 9, reflected by the wave-coupling prism 3, converged by the collimator lens 4 to be parallel light and incident into the liquid crystal lens element 30 in off-state as ordinarily polarized light. Further, it is transformed into circularly polarized light by the phase plate 33 (refer to FIG. 6) in the liquid crystal lens element 30, and a light flux corresponding to a numerical aperture $NA_2$=0.65 whose aperture is limited by the diffraction grating 18 of the liquid crystal lens element 30, is transformed to have a transmission wavefront shown in FIG. 8(B) for correcting an aberration generated due to the difference of cover thickness of optical disk, by the phase correction surface 32 (refer to FIG. 6) in the liquid crystal lens element 30, and converged on an information recording layer of an DVD optical disk D by the objective lens 5 for BD. Meanwhile signal light reflected by the information recording layer is returned back through the same optical path as it comes out, transformed into extraordinarily polarized light by the phase plate 33 in the liquid crystal lens element 30, reflected by the wave-coupling prism 3, transmitted through the wave-couplings prism 9 and converged on a photo-receiving plane of a photodetector in the DVD unit is 8A, to be transformed into electrical signal.

(III) Further, light of wavelength $\lambda_3$=790 nm emitted from the CD unit 8B, is reflected by the wave-coupling prism 9 and the wave-coupling prism 3, converged by the collimator lens 4 to be parallel light and incident into the liquid crystal lens element 30 in on-state as extraordinarily polarized light. Further, without having a change of polarization plane by the phase plate 33 in the liquid crystal lens element 30, a light flux corresponding to a numerical aperture $NA_3$=0.50 is transformed into divergent light having a transmission wavefront shown in FIG. 8(C) for correcting an aberration generated due to the difference of cover thickness of optical disk, by a Fresnel lens constituted by the concave-convex portion 17 and the liquid crystal layer 16 (refer to FIG. 6 for these) in the liquid crystal lens element 30, and converged on an information recording layer of a CD optical disk D by the objective lens 5. Signal light reflected by the information recording layer is returned back through the same optical path as it comes out remaining extraordinarily polarized light, and is converged on a photo-receiving plane of a photodetector in the CD unit 8B, and transformed into electrical signal. Here, a light flux straightly transmitted through a region of numerical aperture $NA_2$ excluding a region of numerical aperture $NA_3$ is not converged on an information recording layer of CD optical disk D, and as a result, the Fresnel lens in the $NA_3$ region performs aperture-limiting function.

Figure 9:
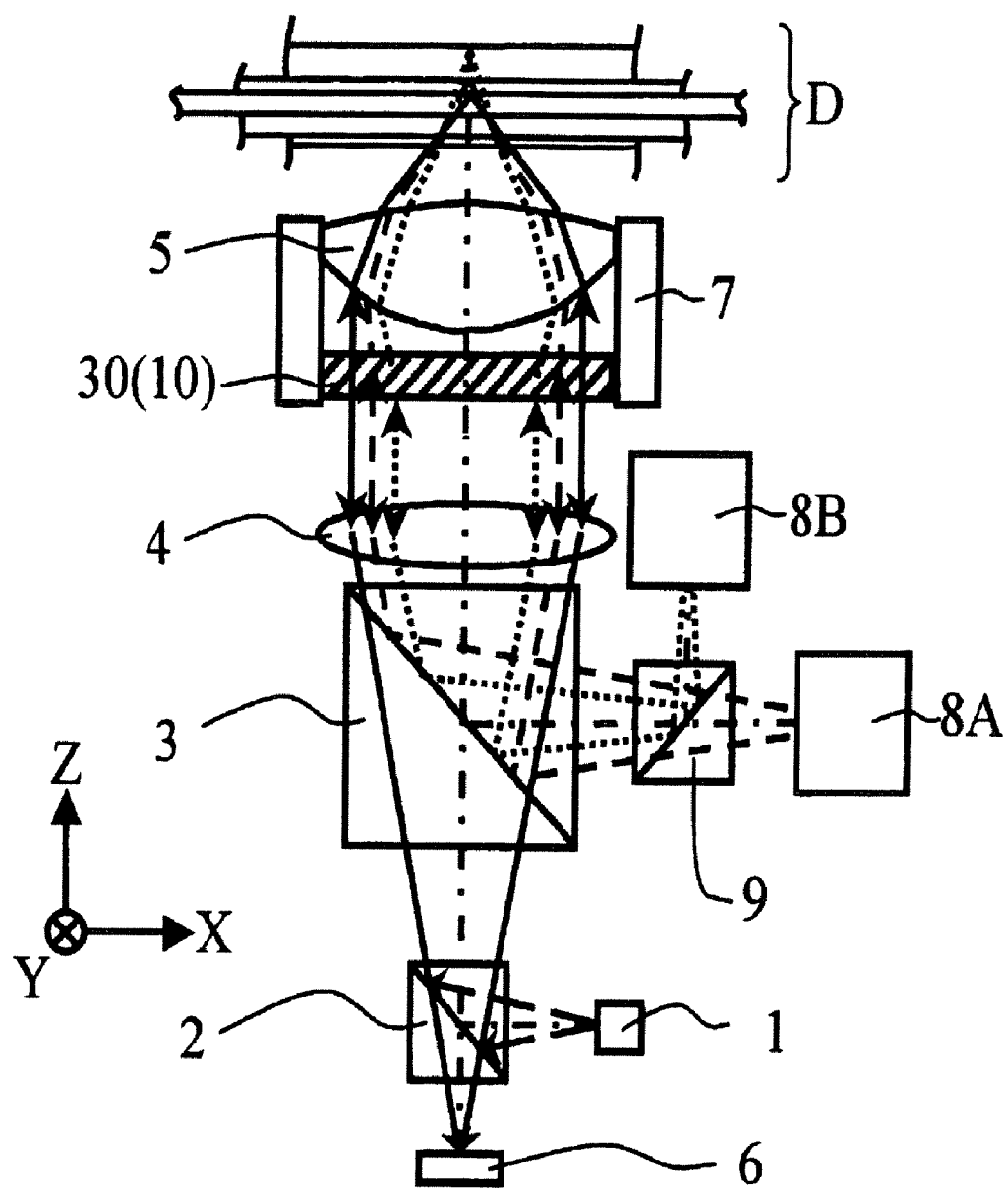
FIG. 9: A construction view showing an optical head device of a third embodiment employing the liquid crystal lens element of the present invention.

As shown in FIG. 9, by fabricating the concave-convex portion 17 and the phase correction surface 32 (refer to FIG. 6 for these) so that light of wavelength $\lambda_2$ and wavelength $\lambda_3$ transmitted through the liquid crystal lens element 30 becomes divergent light, it is possible to expand working distances for optical disks D for DVD and CD as optical paths indicated by the broken lines and dotted lines of FIG. 9, and accordingly, stability at a time of operating focus servo by the actuator 7, improves.

Thus, according to the optical head device 40 of this embodiment, it is possible to use the objective lens 5 for BD and the liquid crystal lens element 30 as an integrated complex lens, not only correction of a spherical aberration generated by the difference of cover thicknesses between the optical disks D of DVD and CD, but also a concave lens function of expanding working distance, can be added. As a result, an optical head device of small-sized and light-weight, which can stably write/read three types of optical disks for ED, DVD and CD, is realized.

Further, since the liquid crystal lens element 30 in off-state shows high transmittance for light of wavelength $\lambda_1$ and wavelength $\lambda_2$, and a quarter waveplate is integrated with the element, by using a polarizing beam splitter in combination, it is possible to obtain an optical system having high light-utilization efficiency. As a result, the liquid crystal element 30 is suitable for an optical head device of high-speed writing of BD and DVD.

Fourth Embodiment

An example of the construction of a liquid crystal lens element 50 according to the fourth embodiment of the present invention, is described in detail with reference to a side view shown in FIG. 10 and a plan view shown in FIG. 11.

The liquid crystal lens element 50 of this embodiment is constituted by a first liquid crystal lens portion 50C and a second liquid crystal lens portion 50D each having the same construction as that of the liquid crystal lens element 10 according to the first embodiment. The first liquid crystal lens portion 50C and the second liquid crystal lens portion 50D have transparent substrates 11, 12C and 12D, first transparent electrodes 13C and 13D, second transparent electrodes 14C and 14D, seals 15C and 15D, liquid crystal layers 16C and 16D and concave-convex portions 17C and 17D respectively.

Among these, the concave-convex portions 17C and 17D each has a shape of Fresnel lens or a Fresnel lens approximated by steps, and made of a transparent material of refractive index $n_F$ substantially equal to the ordinary refractive index $n_o$ of the liquid crystals layers 16C and 16D, and is formed in a region of effective diameter Φ so as to have rotational symmetry about an optical axis (Z axis) of incident light.

Then, an example of process for producing the liquid crystal lens element 50 is described as follows.

First of all, on one surface of transparent substrates 12C and 12D, the respective first transparent electrodes 13C and 13D are formed. Further, in a region of effective diameter Φ on the transparent electrodes 13C and 13D, the respective concave-convex portions 17C and 17D are formed using a transparent material of refractive index $n_F$.

Meanwhile, on both surfaces of the transparent substrate 11, the respective second transparent electrodes 14C and 14D are formed, and an adhesive agent, not shown in which a gap control agent is mixed, is patterned by printing to form the respective seals 15C and 15D, and thereafter, the above transparent substrates 12C and 12D are overlapped with the respective seals, and press-bonded to form an empty cell.

Then, from injection ports (not shown) provided a part of each of the seals 15C and 15D, a nematic liquid crystal having a negative dielectric anisotropy and having an ordinary refractive index $n_o$ and an extraordinary refractive index $n_e$ (here, $n_o \neq n_e$), is injected, and thereafter, these injection ports are sealed to seal the liquid crystals in the cell to form liquid crystal layers 16C and 16D to constitute the liquid crystal lens element 50 of this embodiment.

Figure 11:
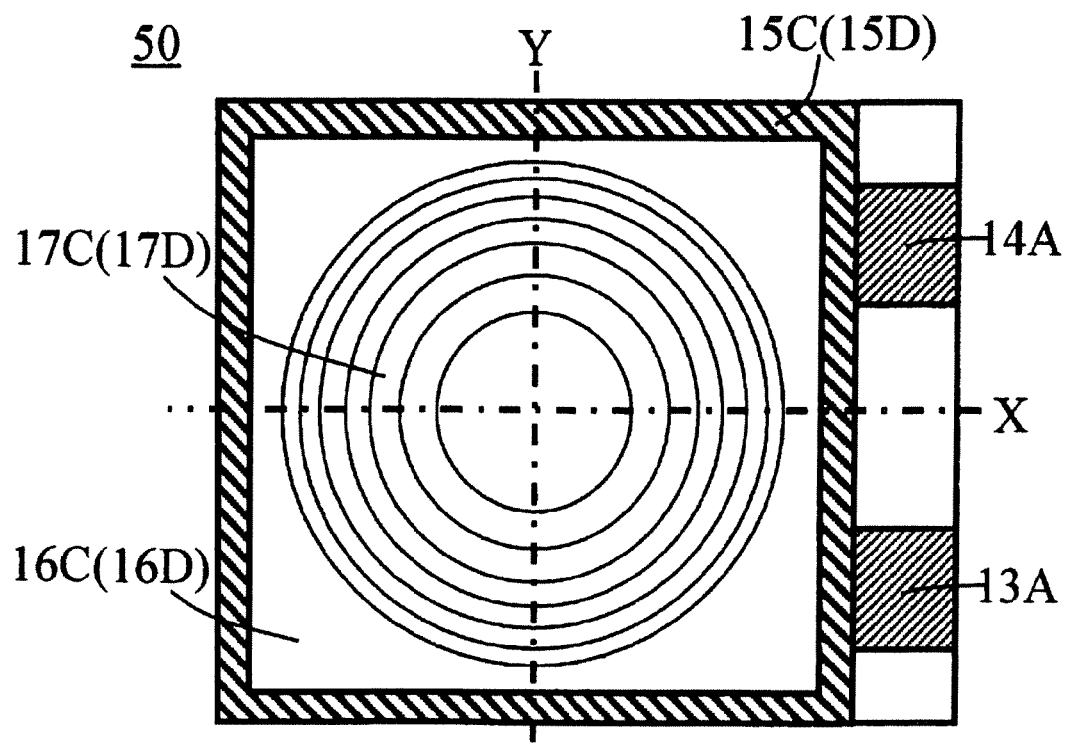
FIG. 11: A lateral cross-sectional view showing the construction of the liquid crystal lens element shown in FIG. 10.

Here, in this embodiment, voltage is applied to the first transparent electrodes 13C and 13D through an electrode 13A (refer to FIG. 11) formed on the transparent substrate 11, and voltage is applied to the second transparent electrodes 14C and 14D through an electrode 14A (refer to FIG. 11). An external AC power source (not shown) is connected with the electrode 13A and the electrode 14A to apply AC voltage to the liquid crystal layers 16C and 16D.

Further, in order to align alignment direction of liquid crystal molecules of the liquid crystal layers 16C and 16D in X direction and Y direction respectively according to applied voltage between the first and the second transparent electrodes, on surfaces of at least the second transparent electrodes 14C and 14D, alignment films (not shown) subjected to alignment treatment in X direction and Y direction respectively, are formed.

In a case where the concave-convex portions 17C and 17D and the liquid crystal layers 16C and 16D have electric specific resistances large enough to be regarded as electrical insulators, an applied voltage $V_P$ is present, at which transmission wavefront of incident light shows a power component (lens function) according to the Fresnel lens shapes of the concave-convex portions 17C and 17D. Accordingly, a liquid crystal lens element 50 is obtained, which can switch convergent point of transmission light by switching applied voltage V. Here, since the first liquid crystal lens portion 50 C shows focal length switching function for linearly polarized light polarized in X direction, and the second liquid crystal lens portion 50D shows focal length switching function for linearly polarized light polarized in Y direction, the liquid crystal lens element 50 shows focal length switching function regardless of incident polarization state.

Figure 10:
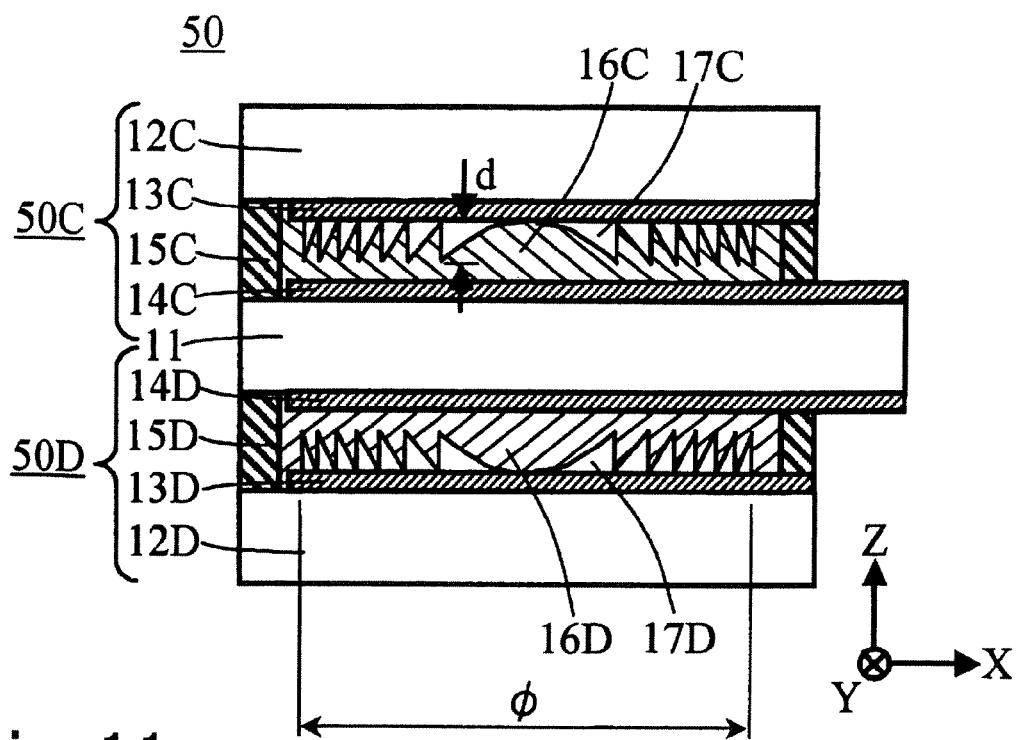
FIG. 10: A vertical cross-sectional view showing the construction of a liquid crystal lens element of a fourth embodiment according to the present invention.

Further, the liquid crystal lens element 50 shown in FIG. 10 has Fresnel lenses constituted by the concave-convex portions 17C and 17D respectively and whose central portions are each concave, and substantial refractive index of the liquid layers at an applied voltage $V_P$ is larger than the refractive index of the concave-convex portions, and thus, the liquid crystal lens element 50 produces a transmission wavefront having a positive power component (convex lens function).

The cross-sectional shapes of the concave-convex portions 17C and 17D of Fresnel lens shape or a Fresnel lens shape approximated by steps, are, as described in the liquid crystal lens element 10 according to the first embodiment, each fabricated so that the optical path difference OPD of transmission light is represented by formula (1).

In the case of the liquid crystal lens element 50 of this embodiment, the shapes of the concave-convex portions 17C and 17D are determined so that, in an optical head device for writing/reading single layer and double layer optical disks, the element corrects a spherical aberration generated due to the difference of cover thicknesses and so that no deterioration of aberration occurs even in a case where the element is disposed separately from an objective lens and the objective lens and the liquid crystal lens element 50 are misaligned at a time of tracking operation of the objective lens.

A transmission wavefront at an applied voltage $V_P$ including a positive power component generated by the first liquid crystal lens portion 50C and the second liquid crystal lens 50D, is determined by the Fresnel lens shapes of the concave-convex portions 17C and 17D. Accordingly, by forming the concave-convex portions 17C and 17D into the same shape, the same transmission wavefront is output in response to linearly polarized incident light beams polarized in X direction and Y direction respectively.

In FIG. 10, since the concave-convex portions 17C and 17D are separated by the transparent substrate 11, the difference of focal points corresponding to the distance of separation is generated. The annular shapes of the concave-convex portions 17C and 17D may be formed so as to cancel such a difference of focal points between different incident polarizations. Further, the shapes of the concave-convex portions 17C and 17D may be selected so as to produce completely different power components for linearly polarized incident light beams polarized in X direction and Y direction respectively.

Figure 12:
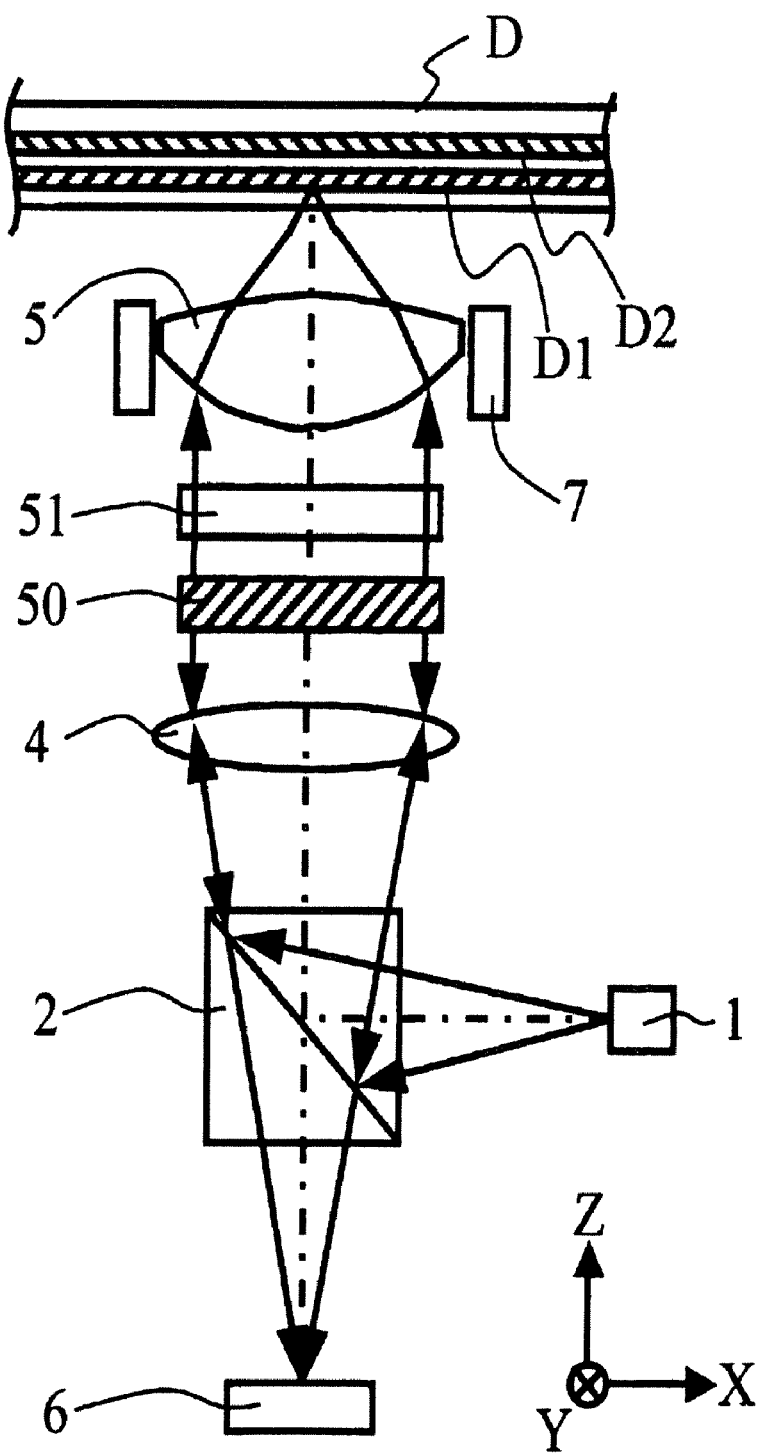
FIG. 12: A construction view showing an optical head device employing the liquid crystal lens element of the fourth embodiment according to the present invention.

Then, an optical head device 60 to be used for writing/reading single layer and double layer BD optical disks or DVD optical disks, employing the liquid crystal lens element 50 according to the fourth embodiment of the present invention, is described with reference to FIG. 12 showing the construction view.

In the optical head device 60 of this embodiment, optical components having the same functions as those of the three-wavelength-compatible optical head device 40 according to the third embodiment shown in FIG. 9, are designated as the same symbols, and their explanations are omitted.

For example, in the optical head device 60 employing an objective lens 550 designed to minimize an aberration for a single layer BD optical disk having a cover thickness of 0.100 mm, at a time of writing/reading to/from an information recording layer D1 with a cover thickness of 0.075 mm of a double layer BD optical disk, a positive power component corresponding to a convex lens is produced by applying an applied voltage $V_P$ (on-state) to the liquid crystal lens element 50, to reduce generation of aberration. Here, for an information recording layer of single layer optical disk and an information recording layer D2 double layer BD optical disk each having a cover thickness of 0.100 mm, the liquid crystal lens element 50 does not produce transmission wavefront change by not applying voltage (off-state), and thus, stable writing/reading is achieved.

Here, in a case of employing an objective lens 5 designed to minimize an aberration for a cover thickness 0.0875 mm in the middle of the cover thicknesses 0.100 mm and 0.075 mm of double layer BD optical disks, by constituting a finite system arrangement in which light flux incident into the objective lens 5 is slightly divergent light, an aberration is minimized for a cover thickness 0.100 mm. Also in this case, by switching applied voltage to the liquid crystal lens element 50, stable writing/reading to the information recording layer of signal layer optical disk and information recording layers D1 and D2 of double layer BD optical disk, is realized.

Further, in an optical head device employing an objective lens designed to minimize an aberration for an optical disk having a cover thickness of 0.59 mm, a negative power component corresponding to a concave lens is produced by applying an applied voltage $V_P$ to the liquid crystal lens element 50 to reduce generation of aberration for an optical disk having a cover thickness of 0.62 mm. Accordingly, at a time of writing/reading to/from an information recording layer D2 of a double layer DVD optical disk having cover thicknesses of from 0.61 mm to 0.63 mm, a voltage $V_P$ is applied to the liquid crystal lens element 50 to realize stable writing/reading. On the other hand, at a time of writing/reading to/from an information recording of a single layer DVD optical disk having a cover thickness of 0.60 mm and an information recording plane D1 of a double layer DVD optical disk having cover thicknesses of from 0.57 to 0.59 mm, writing/reading is performed by an aberration function of the objective lens without applying voltage to the liquid crystal lens element 50. As a result, by switching on-off of voltage application to the liquid crystal lens element 50, stable writing/reading of the single layer and double layer optical disks, is realized.

Here, in an optical head device employing an objective lens designed to minimize an aberration for a single layer DVD optical disk having a cover thickness of 0.60 mm, by constituting a finite system arrangement in which a light flux incident into the objective lens is slightly divergent light, for example, the aberration becomes minimum for a cover thickness 0.61 mm. By generating a positive power component corresponding to a convex lens by applying a voltage $V_P$ to the liquid crystal lens element 50, generation of aberration is reduced for an optical disk having a cover thickness of 0.59 mm. Namely, by switching applied voltage to the liquid crystal lens element 50, it is possible to minimize an aberration for the cover thicknesses 0.59 mm and 0.61 mm.

Further, by disposing a quarter waveplate 51 in an optical path between the liquid crystal lens element 50 and the objective lens 5, so that polarizations of light beams of outgoing path and returning path input into the polarizing beam splitter 2 become perpendicular to each other, high-efficiency beam splitter is constituted. Here, to the liquid crystal lens element 50, perpendicular linearly polarized light beams of outgoing path and returning path are incident and the liquid crystal lens element 50 exhibits aberration correction functions to both of the polarized light beams, to maintain stable writing/reading functions.

Fifth Embodiment

An embodiment of a BD/HDDVD compatible optical head device capable of writing/reading BD and HDDVD optical disks employing the liquid crystal lens element of the present invention, is described as follows with reference to a construction view shown in FIG. 13 in which an objective lens 5 for BD and a liquid crystal lens 50 are fixed to an actuator 7.

The liquid crystal lens 50 of this embodiment has a construction equivalent to that of the liquid crystal lens element 50 according to the fourth embodiment shown in FIG. 10, but different from the fourth embodiment in the following points.

The liquid crystal lens element 50 has a light-transmission region corresponding to the effective diameter of an objective lens 5 for BD of NA 0.85, but concave-convex portions 17C and 17D (refer to FIG. 10) are formed only in an effective diameter region corresponding to NA 0.65. Further, in order to cancel a spherical aberration generated at a time of converging incident light of wavelength $\lambda_1$ incident into a NA 0.65 region, on an information recording layer of a HDDVD optical disk having a cover thickness of 0.60 mm by using an objective lens 5 for BD, and to expand a distance between the objective lens and the optical disk, the concave-convex portions 17C and 17D each has a Fresnel lens shape for producing a transmission wavefront containing a negative power component (concave lens function) by the liquid crystal lens element 50 at an applied voltage $V_P$.

Here, at a time of writing/reading a BD optical disk D (BD), as shown in FIG. 13(A), since no transmission wavefront change occurs when no voltage is applied (off-state) to the liquid crystal lens element 50, and thus, transmission light (indicated by solid lines) is efficiently converged on an information recording layer having a cover thickness of 0.100 mm by the objective lens 5 for BD, whereby stable writing/reading of the BD optical disk is realized.

On the other hand, at a time of writing/reading a HDDVD optical disk D (HD), as shown in FIG. 13(B), when a voltage $V_P$ is applied (on-state) to the liquid crystal lens element 50, transmission light (indicated by solid lines) through a NA 0.65 region of the liquid crystal lens 50 becomes divergent light and is efficiently converged on an information recording layer having a cover thickness of 0.60 mm by the objective lens 5 for BD, which realizes stable writing/reading of the HDDVD optical disk. Here, a light flux in NA 0.85 and outside of NA 0.65 region, is straightly transmitted (indicated by broken lines) through the liquid crystal lens element 50, and is not converged on an information recording layer of the HDDVD optical disk by the objective lens 5 for BD, and thus, the light flux does not affect a light flux for writing/reading transmitted through the region of NA 0.65. As a result, by employing the objective lens for BD and the liquid crystal lens element, a BD/HDDVD compatible optical head device is realized, which can write/read BD optical disk and HDDVD optical disk having different standards.

In this embodiment, since the liquid crystal lens element 50 is employed which comprises a first liquid crystal lens portion 50C (refer to FIG. 10) functioning for linearly polarized light polarized in X direction and a second liquid crystal lend portion 50D (also refer to FIG. 10) functioning for linearly polarized light polarized in Y direction, and thus a focal-length-switching function is obtained regardless of polarization state of incident light. Accordingly, a quarter wavelength plate may be disposed any one of the optical path between the collimator lens and the liquid crystal lens portion 50 or the optical path between the objective lens for BD and the liquid crystal lens portion 50. Further, instead of the liquid crystal lens portion 50, the construction of the liquid crystal lens portion 10 shown in FIG. 1 or the construction of the liquid crystal lens 30 shown in FIG. 6 may be employed. Also in this case, the concave-convex portion 17 is formed only in an effective diameter region corresponding to NA 0.65, and constitutes a Fresnel lens shape producing a transmission wavefront containing a negative power component (concave lens function) added by the liquid crystal lens element at an applied voltage $V_P$, to cancel a spherical aberration generated at a time of converging linearly polarized incident light of wavelength $\lambda_1$ polarized in X direction incident into NA 0.65 region, on an information recording layer of a HDDVD optical disk having a cover thickness of 0.60 mm by using the objective lens 5 for BD, and to expand the distance between the objective lens and the optical disk.

Here, in this embodiment, an example of construction is described in which the objective lens 5 for BD and the liquid crystal lens 50 are fixed to the actuator 7, but the liquid crystal lens 50 may be disposed on a fixed portion in an optical path between the collimator lens and the objective lens 5 for BD, without being held by the actuator 7. In this case, there is a merit that weight load to the actuator 7 is reduced.

Further, in this embodiment, an example of BD/HDDVD compatible optical head is shown, which employs an objective lens for BD designed for a BD optical disk having a cover thickness of 0.100 mm, but another objective lens may be employed. For example, an objective lens is employed, whose NA 0.65 region is designed to converge parallel incident light of wavelength $\lambda_1$ on an information recording layer of a HDDVD optical disk having a cover thickness of 0.60 mm, and whose annular region in the region of NA 0.85 and outside of the region of NA 0.65, is designed to converge parallel incident light of wavelength $\lambda_1$ on an information recording layer of a BD optical disk having a cover thickness of 0.100 mm. When parallel light of wavelength $\lambda_1$ is incident into such an objective lens, focal points are different between the NA 0.65 region and the annular region, and light flux through the NA 0.65 region is efficiently converged on the information recording layer of the HDDVD optical disk, and thus, stable writing/reading of the HDDVD disk is realized. On the other hand, a light flux an annular region in NA 0.85 region and outside of NA 0.65 region, is converged on an information recording layer of a BD optical disk, but a light flux in NA 0.65 region is not converged. To solve this problem, the liquid crystal lens element is employed to converge a light flux in the NA 0.65 region on an information recording layer of a BD optical disk in the same manner as the light flux of the annular region, and for this purpose, the Fresnel lens shape constituted by the concave-convex portions 17 (17C and 17D) is configured to generate transmission wavefront containing positive power component (convex lens function) added by the liquid crystal lens element at an applied voltage $V_P$, so as to cancel a spherical aberration generated at a time of converging light on an information recording layer of a BD optical disk having a cover thickness of 0.100 mm.

EXAMPLES

Example 1

A specific Example of the liquid crystal lens element 30 of the present invention shown in the second embodiment, is described as follows with reference to FIG. 6.

A process for producing the liquid crystal lens element 30 is described.

(i) On a glass substrate being a transparent substrate 11, a transparent conductive film (ITO film) is formed to be a first transparent electrode 13. On the first transparent electrode 13, by a sputtering method using a Si sputtering target and an arcing gas that is Ar gas mixed with oxygen and nitrogen, a $SiO_xN_y$ film of uniform refractive index $n_F$ (=1.49) and a film thickness d (=0.30 μm) is formed.

Further, a photoresist is patterned by photolithography technique using a photomask, and a $SiO_xN_y$ film is fabricated into a shape corresponding to the shape of graph β of FIG. 3 by a reactive ion etching method. As a result, in a region of effective diameter 2.65 mm corresponding to a numerical aperture $NA_3$=0.50, concave-convex portion 17 is formed to have a shape of Fresnel lens approximated by steps of 16 steps whose cross section is as shown in FIG. 6. Thereafter, on the surface of the concave-convex portion 17, a vertical alignment film (not shown) is formed to have a film thickness of about 50 nm.

(ii) Further, on a glass substrate being a transparent substrate 12, a transparent conductive film (ITO film) is formed, to be a second transparent electrode 14. Further, on the second transparent electrode 14, a vertical alignment film (not shown) is formed to have a film thickness of about 50 nm, and subjected to a rubbing treatment in X axis direction, to be an alignment film for liquid crystal. Then, on the second transparent electrode 14 side of the transparent substrate 12, an adhesive agent containing a gap control agent having a diameter of 8 μm is patterned by printing to form a seal 15, and the transparent substrate 11 is laminated on the seal 15 and press bonded to form an empty cell. Thereafter, a liquid crystal is injected through an injection port (not shown) of the empty cell, and the injection port is sealed to form a liquid crystal layer 16 to form a liquid crystal lens element 10. As the liquid crystal for the liquid crystal layer 16, a nematic liquid crystal is employed, which has an ordinary refractive index $n_o$ (=1.49), an extraordinary refractive index $n_3$ (=1.64) and a negative dielectric anisotropy ($\Delta\epsilon=\epsilon_{//}-\epsilon_{\perp}=-10$). Further, this liquid crystal is aligned vertically to the surfaces of the concave-convex portion 17 and the second transparent electrode 14 at a time of no voltage application, and liquid crystal molecules are inclined to X axis direction as applied voltage increases, to approach homogeneous alignment.

(iii) An AC power source is connected to the first transparent electrode 13 and the second transparent electrode 14 of the liquid crystal lens element 10 thus obtained, and rectangular AC voltage V is applied. The ratio $V_{LC}/V$ between an applied voltage V and an applied voltage $V_{LC}$ distributed to the liquid crystal layer 16, depends on the film thickness $d_F$ of the concave-convex portion 17 and the film thickness $d_{LC}$ of the liquid crystal layer 16 shown in FIG. 4, as represented by formula (2), and a voltage distribution $V_{LC}$ corresponding to the Fresnel lens shape constituted by the concave-convex portion 17, is formed. As a result, for linearly polarized incident light having a polarization plane in which polarization direction is X axis direction, an optical path difference OPD between the transparent electrodes is distributed as represented by formula (3) with respect to the distribution of the film thickness $d_F$ of the concave-convex portion 17. The film thickness $d_F$ of the concave-convex portion 17 made of $SiO_xN_y$ film is distributed from d to zero, and an optical path difference OPD with respect to the central portion ($d_F$=d) of the Fresnel lens shape is distributed from 0 to $OPD_0$ of formula (4).

Here, the liquid crystal layer 16 at a time of no voltage application (V=$V_0$=0) becomes an uniform refractive index layer of n(0)=$n_o$ which equals to the refractive index $n_F$ of the $SiO_xN_y$ film of the concave-convex portion 17, and thus, $OPD_0$ becomes substantially zero regardless of wavelength and polarization state of incident light. Namely, the incident light is straightly transmitted without having change of transmission wavefront.

On the other hand, when the applied voltage V between the transparent electrodes is increased, $OPD_0$ of formula (4) for extraordinarily polarized light changes, and an applied voltage $V_P$ is present at which a $OPD_0$ becomes substantially $\lambda_3$ at a wavelength $\lambda_3$=790 nm for CD. Accordingly, for extraordinarily polarized light of wavelength $\lambda_3$ incident into the liquid crystal lens element 30, transmission wavefront can be switched between a transmission wavefront having no power and a divergent light transmission wavefront having negative power corresponding to β of FIG. 3 by switching the applied voltage between $V_0$ and $V_P$.

When an objective lens for BD having a focal length of 2.40 mm at a wavelength $\lambda_1$=405 nm, is employed to read/write a CD optical disk by using light of wavelength $\lambda_3$=790 nm, a large spherical aberration having a maximum optical path difference of about 1.4 $\lambda_3$ and an RMS wavefront aberration corresponding to about 437 m$\lambda_3$, is generated.

(iv) To cope with this problem, in order to correct this spherical aberration by employing the liquid crystal lens element 10, the concave-convex portion 17 is fabricated so that a transmission wavefront at an applied voltage $V_P$ has an optical path difference OPD of graph β equivalent to graph α of FIG. 3 represented by formula (1) using coefficients $a_1$ to $a_5$ shown in the above-mentioned Table 1. Here, in formula (1), the unit of optical path difference OPD is [μm] and the unit of r is [mm].

In this Example, since the concave-convex portion 17 of the Fresnel lens is approximated by step shape of 16 steps, the thickness of the concave-convex portion 17 is d=3.0 μm and the distance G between electrodes is 8 μm so that the optical path difference $OPD_0$ between the electrodes represented by formula (4) becomes substantially 0.74 μm at an applied voltage $V_P$=3.8 V being an effective AC voltage of rectangular wave.

Calculated values of generation efficiencies of transmission wavefronts generated at switched applied voltages $V_0$ and $V_P$ at a wavelength $\lambda_3$=790 nm, becomes 100% and 98% receptively.

(v) Then, in a region of effective diameter 3.2 mm corresponding to a numerical aperture $NA_2$=0.65 on a surface of a quartz glass substrate being a transparent substrate 31, a phase correction surface 32 is formed, which is constituted by a step-shaped grating of the transparent substrate 31 of 6 levels 5 steps having a step height $d_1$, being one step of concave-convex portion, is 1.73 μm. The glass substrate has a refractive index of 1.47 at a wavelength $\lambda_1$, and a refractive index of 1.45 at wavelengths $\lambda_2$ and $\lambda_{23}$, and a phase difference corresponding to one step is 2.0 $\lambda_1$ at the wavelength $\lambda_1$, 1.18 $\lambda_2$ at the wavelength $\lambda_2$ and 0.99 $\lambda_3$ at the wavelength $\lambda_3$. Accordingly, wavefront of transmission light of wavelength $\lambda_2$ transmitted through the phase correction surface 32 changes according to the concave-convex shape, but wavefront of transmission light of wavelength $\lambda_1$ or $\lambda_3$ does not change.

When the above-mentioned objective lens for BD is employed to read/write a DVD optical disk by using light of wavelength $\lambda_2$=660 nm, a large spherical aberration having a maximum optical path difference of about 2.7 $\lambda_2$ and an RMS (Root Mean Square) wavefront aberration corresponding to about 794 m$\lambda_2$, is generated.

Then, in order to correct this spherical aberration, the phase correction surface 32 is fabricated on a surface of the transparent substrate 31 so that the transmission wavefront has an optical path difference OPD of graph β equivalent to graph α of FIG. 3 represented by formula (1) using coefficients $a_1$ to $a_5$ shown in the above-mentioned Table 2.

(vi) In an annular region corresponding to an effective diameter of from 3.8 mm to 4.2 mm including a region of numerical aperture $NA_1$=0.85 and excluding a region of numerical aperture $NA_2$=0.65 of the transparent substrate 31, a diffraction grating 18 of 0.87 μm deep having a rectangular cross-sectional shape, is formed. Phase difference corresponding to the step height of the diffraction grating is 1.01 $\lambda_1$ at a wavelength $\lambda_1$, 0.59 $\lambda_2$ at a wavelength $\lambda_2$ and 0.50 $\lambda_3$ at a wavelength $\lambda_3$. Accordingly, light of wavelength $\lambda_1$ is straightly transmitted without being diffracted but most of the light of wavelength $\lambda_2$ and wavelength $\lambda_3$ is diffracted and straightly transmitted light is at most 15%, whereby an aperture limiting function is obtained.

(vii) Further, on the other surface of the transparent substrate 31, a phase plate 33 made of a polymer liquid crystal film is formed. The polymer liquid crystal film is one having a film thickness of 6.8 μm and its molecules are aligned in a direction at an angle of 45° to X axis in the plane of transparent substrate 31. Provided that birefringency Δn of the polymer liquid crystal film is 0.134 at the wavelength $\lambda_1$, 0.122 at the wavelength $\lambda_2$ and 0.117 at the wavelength $\lambda_3$, the retardation value Rd of the phase plate 33 becomes 2.25 $\lambda_1$ at the wavelength $\lambda_1$ 1.26 $\lambda_2$ at the wavelength $\lambda_2$ and 1.00 $\lambda_3$ at the wavelength $\lambda_3$. Accordingly, the phase plate 33 becomes equivalent to a quarter wavelength plate at wavelengths $\lambda_1$ and $\lambda_2$, and the phase plate 33 does not function as a wavelength plate at the wavelength $\lambda_3$.

(viii) Finally, a surface of the transparent substrate 31 on which the phase plate 33 is formed, is bonded and fixed to the liquid crystal lens element 10, to constitute a liquid crystal lens element 30. As a result, functions and effects described in the second embodiment can be obtained. Further, the liquid crystal lens element 30 is mounted on the actuator 7 of the optical head device 40 shown in FIG. 9 described in the third embodiment.

According to this Example, for example, in FIG. 9, in an outgoing path in which light is converged towards the optical disk D, when the liquid crystal lens element 30 is in off-state, ordinarily polarized incident light (having a polarization plane in which polarization direction is Y axis direction) of wavelength $\lambda_1$ for BD is suitably converged on an information recording layer of a BD optical disk having a cover thickness of 0.1 mm present at a working distance of 0.96 mm. Further, ordinarily polarized incident light of wavelength $\lambda_2$ for DVD, is suitably converged on an information recording layer of a DVD optical disk having a cover thickness of 0.6 mm present at a working distance of 0.68 mm. Further, when the liquid crystal lens element 30 is in on-state, extraordinarily polarized incident light (having a polarization plane in which polarization direction is Y axis direction) of wavelength $\lambda_3$ for CD, is suitably converged on an information recording layer of a CD optical disk having a cover thickness of 1.2 mm and present at a working distance of 0.60 mm.

Further, in a returning path in which light reflected by the optical disk D is converged into the photodetector, light beams of wavelength $\lambda_1$ and wavelength $\lambda_2$ are transformed into extraordinarily polarized light beams by the liquid crystal lens element 30, and suitably converged on the respective photodetectors. Light of wavelength $\lambda_3$ is output from the liquid crystal lens element 30 as it remains extraordinarily polarized light, and is suitably converged on a photodetector. As a result, by employing the objective lens 5 for BD and the liquid crystal lens element 30, writing/reading of three types of optical disks BD, DVD and CD, is realized.

Example 2

Then, a specific example of the liquid crystal lens element 10 of the present invention shown in the first embodiment, is described as follows with reference to FIG. 1 and FIG. 4.

The liquid crystal lens element 10 in the liquid crystal lens element 30 of Example 1 and that of Example 2 are different in the following two points. Namely, instead of a $SiO_xN_y$ film, a polymer liquid crystal is used as a Fresnel lens constituted by the concave-convex portion 17, and the shape of the concave-convex portion 17 is a Fresnel lens shape having a concave central portion instead of the Fresnel lens having a convex central portion shown in FIG. 1. Further, as the liquid crystal of the liquid crystal layer 16, instead of nematic liquid crystal having negative dielectric anisotropy, a nematic liquid crystal having positive dielectric anisotropy is employed.

Here, the concave-convex portion 17 is made of a polymer liquid crystal having an ordinary refractive index $n_{Fo}$ (=1.52) and an extraordinary refractive index $n_{Fe}$ (=1.66) in which molecules are aligned in X axis direction and which has a film thickness of 3.2 μm. Further, the liquid crystal of the liquid crystal layer 16 has an ordinary refractive index $n_o$ (=1.50) and an extraordinary refractive index $n_e$ (1.66) and a dielectric anisotropy $\Delta \in$ of 11, in which alignment direction of liquid crystal molecules at no voltage application is uniformly in X axis direction which is the same as the alignment direction of the polymer liquid crystal. No alignment film is formed on the surface of the concave-convex portion 17 made of the polymer liquid crystal, and a rubbing treatment in X direction is directly applied to the surface of the polymer liquid crystal to form a homogeneous alignment in which the alignment of liquid crystal molecules on the surface of the concave-convex portion 17 at a time of no voltage application is uniformly in X axis direction. Further, as the applied voltage increases, the liquid crystal molecules incline towards Z axis direction, whereby the alignment approaches vertical alignment.

Substantial refractive index of the liquid crystal layer 16 for ordinarily polarized light and extraordinarily polarized light at a time of no voltage application (V=V$_0$=0), substantially equal to the refractive index of the concave-convex portion 17, and thus, without depending on wavelength and polarization state of incident light, an optical path difference of OPD between an optical path from the first transparent electrode 13 to the second transparent electrode 14 at a position of concave-convex portion 17 where the film thickness of $d_F$, and an optical path at the center position ($d_F$=0) of the Fresnel lens, becomes substantially zero regardless of the value of $d_F$. Namely, incident light into the liquid crystal lens element 10 in off state, is straightly transmitted without having change of transmission wavefront.

On the other hand, when an applied voltage V between the transparent electrodes is increased, OPD$_0$ of formula (4) for extraordinarily polarized light changes, and an applied voltage V$_P$ is present, at which OPD$_0$ becomes substantially $\lambda_3$ at $\lambda_3$=790 nm for CD. Accordingly, transmission wavefront of extraordinarily polarized light of wavelength $\lambda_3$ incident into the liquid crystal lens element 10, is switched between an transmission wavefront having no power and a divergent transmission wavefront having a negative power corresponding to β of FIG. 3 by switching an applied voltage between V$_0$ and V$_P$. Accordingly, the same function and effect as those of the liquid crystal lens element 10 portion of Example 1, can be obtained.

Then, an optical head device 40 in which this liquid crystal lens element 10 is mounted on an actuator 7 shown in FIG. 9 described in the third embodiment, is described. Here, as the objective lens 5 for BD, an objective lens for BD of DVD compatible on which a phase correction surface 32 for DVD of the liquid crystal lens element 30 of FIG. 5 is formed on the surface of the objective lens, is employed. Further, a single phase plate element having a construction that a phase plate 33 portion of the liquid crystal lens 30 of FIG. 6 is sandwiched between a pair of transparent substrates, is disposed in an optical path between a wave-coupling prism 3 and a collimator lens 4.

In such a construction, light beams of wavelength $\lambda_1$ and wavelength $\lambda_2$ incident into the liquid crystal lens element 10 become circularly polarized light beams, but the liquid crystal lens element 10 in off-state does not change transmission wavefront regardless of polarization state of incident light.

Further, light of wavelength $\lambda_3$ is incident into the liquid crystal lens element 10 in on-state as it remains extraordinarily polarized light, and is output as it has a divergent transmission wavefront of concave lens function, and thus, the same functions and effects as those of Example 1 are obtained. As a result, by employing an objective lens for BD of DVD compatible and the liquid crystal lens element 10, writing/reading of three types of optical disks BD, DVD and CD is realized.

Example 3

Then, a specific example of the liquid crystal lens element 50 of the present invention shown in the fourth embodiment, is described as follows with reference to FIG. 10.

A first liquid crystal lens portion 50C and a second liquid crystal lens portion 50D each has the same construction as that of the liquid crystal lens element 30 of this embodiment described in detail in Example 1, and functions as an aberration correction element for single layer and double layer BD optical disks.

According to the difference in the purpose of use, the liquid crystal lens element 50 is different from the liquid crystal lens element 30 in the following construction.

Fresnel lenses of the concave-convex portions 17C and 17D is each made of a SiO$_x$N$_y$ film having a film thickness of d (=1.5 μm) and a refractive index of n$_F$ (=1.50) at a wavelength 405 nm, and is formed in a region of effective diameter Φ=3.6 mm which includes lens shift amount ±0.3 mm at a time of tracking in addition to NA of an objective lens. Further, for the liquid crystals of the liquid crystal layers 16C and 16D, a nematic liquid crystal having an ordinary refractive index n$_o$ (=1.50), an extraordinary refractive index n$_e$ (=1.66) and negative dielectric anisotropy, is employed, and a gap control agent is employed to make maximum thickness of the liquid crystal layers 6 μm. In order to make alignment directions of liquid crystal molecules of the liquid crystal layers 16C and 16D perpendicular to each other at a time of voltage application, alignment films subjected to alignment treatment are formed on interfaces facing to the liquid crystal layers.

Here, the concave-convex portions 17C and 17D are each fabricated to have a shape so that its transmission wavefront has an optical path difference OPD represented by formula (1) using the coefficients $a_1$ to $a_5$ shown in Table 3 for incident light of wavelength 405 nm when the liquid crystal lens element 50 is on-state (applied voltage V$_P$=3.5 V). The coefficients shown in Table 3 are the results of designing the liquid crystal lens element 50 so as to correct an aberration generated when an objective lens producing minimum aberration for a single layer BD optical disk having a cover thickness of 0.1 mm is used for an information recording layer of a double layer BD optical disk having a cover thickness of 0.075 mm, including an aberration caused by a misalignment of ±0.3 mm between the objective lens and the liquid crystal lens element 50. The coefficients change as the specification of the objective lens to be used changes.

TABLE 3

| Coefficient | Value |
| --- | --- |
| $a_1$ | 1.966152 |
| $a_2$ | 0.193135 |
| $a_3$ | −0.335921 |
| $a_4$ | 0.330062 |
| $a_5$ | −0.170476 |
| $a_6$ | 0.043338 |

TABLE 3-continued

| Coefficient | Value |
| --- | --- |
| $a_7$ | −0.004350 |
| $a_8$ | 0.000021 |

As a result, regardless of polarization state of incident light, transmission wavefront of incident light into the liquid crystal lens 50 does not change when the element is off-state (no voltage application), but when the element is on-state, the transmission wavefront becomes a convergent transmission wavefront at a wavelength 405 nm by a lens function corresponding to convex lens.

The liquid crystal lens element 50 thus obtained, is employed in an optical head device 60 shown in FIG. 12 for writing/reading a BD optical disk. Here, the objective lens 5 is designed to minimize an aberration for a single layer BD optical disk having a cover thickness of 0.1 mm. Here, at a time of writing/reading to/from an information recording layer having a cover thickness of 0.1 mm of a single layer or a double layer BD optical disk, by using the liquid crystal lens element 50 in off-state, transmission wavefront through the liquid crystal lens element 50 does not change, and thus, stable writing/reading is possible. Meanwhile, at a time of writing/reading to/from an information recording layer having a cover thickness of 0.075 mm of a double layer BD optical disk, by using the liquid crystal lens element 50 in on-state, an aberration generated due to the difference of cover thickness can be effectively corrected, and thus, stable writing/reading is possible.

In a case of writing/reading to/from an information recording plane of cover thicknesses 0.1 mm and 0.075 mm when the liquid crystal lens element 50 is off-state and on-state, calculation result of RMS wavefront aberrations generated by tracking shift of the objective lens 5 are indicated by ● and ○ in FIG. 14. In response to objective lens shift of 0.3 mm, stable aberration level of at most 17 m$\lambda_1$ (rms) can be maintained. For comparison, calculation result of RMS wavefront aberrations at a time of using a conventional liquid crystal aberration correction element for correcting only spherical aberration in combination with an objective lens in a state that they are separately disposed, are indicated by black square dots in FIG. 14. In response to an objective lens shift of at least 0.1 mm, an aberration of at least 60 m$\lambda_1$ (rms) is generated, and thus, the conventional element does not function as a phase correction element in this condition.

Example 4

Then, as another example of the liquid crystal lens element 50 of the present invention shown in the fourth embodiment, an example of employing the element as an aberration correction element for single layer and double layer DVD optical disks, is described as follows.

According to the difference of the purpose of use, the element is different from the liquid crystal lens element 50 of Example 3 in the following construction.

The Fresnel lenses of the concave-convex portions 17C and 17D, are each made of a $SiO_xN_y$ film of film thickness d (=2 μm) having a refractive index $n_F$ (=1.49) at a wavelength 660 nm, and is formed in a region of effective diameter Φ=4.6 mm including a lens shift amount ±0.3 mm at a time of tracking in addition to a NA of an objective lens. Further, for the liquid crystals of the liquid crystal layers 16C and 16D, a nematic liquid crystal having an ordinary refractive index $n_o$ (=1.49), an extraordinary refractive index $n_e$ (=1.65) and negative dielectric anisotropy, is employed, and a gap control agent is employed to make the maximum thickness of the liquid crystal layer 8 mm. Here, in order to make alignment directions of the liquid crystal molecules of the liquid crystal layers 16C and 16D perpendicular to each other at a time of voltage application, alignment films subjected to alignment treatment are formed on interfaces facing to the liquid crystal layers. Here, the concave-convex portions 17C and 17D are each fabricated to have a shape so that its transmission wavefront has an optical path difference OPD represented by formula (1) using the values of coefficients $a_1$ to $a_5$ shown in Table 4 for incident light of wavelength 660 nm when the liquid crystal lens element 50 is on-state (applied voltage $V_P$=3.5 V). The coefficients shown in Table 3 are the results of designing the liquid crystal lens element 50 so as to correct an aberration generated when an objective lens producing minimum aberration for an optical disk of cover thickness 0.59 mm is used for an information recording plane of an optical disk of cover thickness 0.62 mm, including an aberration caused by a misalignment of ±0.3 mm between the objective lens and the liquid crystal lens element 50. The coefficients is change as the specification of the objective lens to be used changes.

TABLE 4

| Coefficient | Value |
| --- | --- |
| $a_1$ | −0.735147 |
| $a_2$ | −0.003162 |
| $a_3$ | −0.000222 |
| $a_4$ | 0.000217 |
| $a_5$ | −0.000021 |

As a result, regardless of polarization state of incident light, transmission wavefront of incident light into the liquid crystal lens element 50 does not change when the element is off-state (no voltage application), but when the element is in on-state, the transmission wavefront becomes a divergent transmission wavefront for a wavelength 660 nm by a lens function corresponding to a concave lens.

The liquid crystal lens element 50 thus obtained is employed in an optical head device 60 shown in FIG. 12 for writing/reading a DVD optical disk. Here, the objective lens 5 is designed to minimize aberration for an optical disk of cover thickness 0.59 mm. Here, at a time of writing/reading to/from an information recording plane of a single layer DVD optical disk of cover thickness 0.6 mm and a double layer DVD optical disk of cover thickness 0.57 mm, the liquid crystal lens element 50 is used as it is off-state. Meanwhile, at a time of writing/reading to/from an information recording plane of a double layer DVD optical disk of cover thickness 0.63 mm, the liquid crystal lens element 50 is used as it is on-state.

Figure 15:
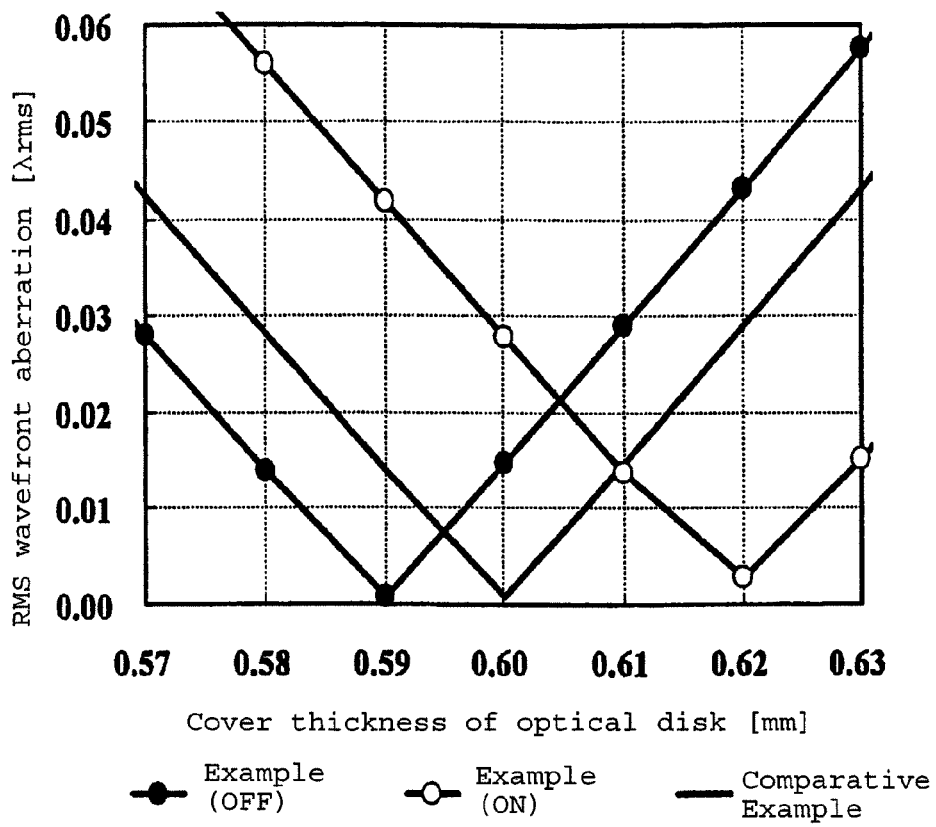
FIG. 15: A graph showing calculated values of wavefront aberration performance of Example 4 of an optical head device employing the liquid crystal lens element according to the present invention and those of a conventional example.
Figure 16:
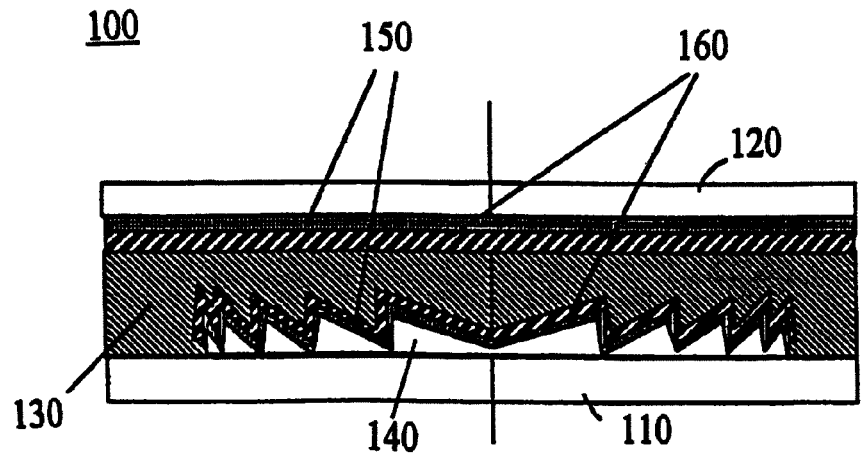
FIG. 16: A vertical cross-sectional view showing an example of the construction of a conventional optical modulation element (liquid crystal diffraction lens).

Calculation results of RMS wavefront aberration generated for an optical disk having a cover thickness of from 0.57 mm to 0.63 mm when the liquid crystal lens element 50 is off-state and on-state, are indicated by ● and ○ in FIG. 15. In the same manner as Example 3, increase of RMS wavefront aberration by tracking shift of the objective lens 5 is slight. Accordingly, for an optical disk having a cover thickness of from 0.57 mm to 0.605 mm, an RMS wavefront aberration of at most 28 m$\lambda_2$ (rms) is maintained when the liquid crystal lens element 50 is used in off-state, and for an optical disk having a cover thickness of from 0.605 mm to 0.63 mm, RMS wavefront aberration becomes at most 21 m$\lambda_2$ (rms) when the liquid crystal lens element 50 is used in on-state. As a result, since an aberration generated due to the difference of cover thickness of single layer and double layer DVD optical disks, is effectively corrected, stable writing/reading is possible. For comparison, calculation result of RMS wavefront aberration in a case of using an objective lens for a single layer DVD optical disk of cover thickness 0.6 mm, is represented by solid lines of FIG. 15. For an optical disk having a cover thickness of from 0.57 mm to 0.63 mm, an aberration of at most 43 m$\lambda_2$ (rms) is generated, and thus, it is difficult to carry out stable writing/reading of particularly a double layer DVD optical disk.

Example 4 shows an example of design of the objective lens 5 and the liquid crystal lens element 50 producing minimum aberration for optical disks having cover thicknesses of 0.59 mm and 0.62 mm, but the combination may be designed to produce minimum aberration for other two types of cover thicknesses. Here, the present invention is by no means limited to the above-mentioned embodiments, but it can be practiced in various embodiments within a range not deviating from the gist of the present invention.

INDUSTRIAL APPLICABILITY

The liquid crystal lens element of the present invention does not produce change of transmission wavefront without depending on polarization state of incident light at a time of no voltage application, and the element can exhibit aberration correction function and concave lens function for incident light of wavelength of extraordinarily polarized light at a time of voltage application. Further, by employing the liquid crystal lens element of the present invention integrally with an objective lens, the present invention is used in an optical head device of small sized which can stably write/read a plurality of types of optical disks.

Further, the liquid crystal lens element of the present invention can be used as an aberration correction element for reducing aberration generated due to the difference of cover thickness in an optical head device for writing/reading an optical disk having single layer or double layer information recording planes. In particular, since the liquid crystal lens element of the present invention can be used as it is disposed separately from an objective lens in the optical head device, the element can be used in an optical head device of small sized which can stably write/read a plurality of optical disks.

The entire disclosures of Japanese Patent Application No. 2004-211246 filed on Jul. 20, 2004, Japanese Patent Application No. 2004-284752 filed on Sep. 29, 2004 and Japanese Patent Application No. 2005-060597 filed on Mar. 4, 2005 including specifications, claims, drawings and summaries are incorporated herein by reference in their entireties.

What is claimed is:

1. A liquid crystal lens element comprising;
a pair of transparent substrates opposed to each other;
a liquid crystal layer sandwiched between the transparent substrates and configured to change a convergent point of light transmitted through the liquid crystal layer according to a magnitude of voltage applied to the liquid crystal layer;
a Fresnel lens configured to switch between an on-state and an off-state by application of the voltage and having a rotational symmetry having a concave-convex portion formed on a flat surface of one of the transparent substrates opposed to the other transparent substrate and having a concave-convex shaped cross-section;
a first transparent electrode formed on a flat surface under the Fresnel lens on said one of the transparent substrates on which the Fresnel lens is formed or on a surface of the concave-convex portion of the Fresnel lens; and
a second transparent electrode formed on a flat surface of said the other transparent substrate opposed to said one of the transparent substrates,
wherein the liquid crystal layer has a substantial refractive index n(V) which changes from a refractive index of the off-state at a time of no voltage application (V=0) to a refractive index of the on-state at a time of voltage application according to the magnitude of voltage V applied between the first transparent electrode and the second transparent electrode for extraordinarily polarized incident light, and the refractive index is ordinary refractive index $n_O$ for ordinarily polarized incident light regardless of the magnitude of the voltage, the liquid crystal layer is a nematic liquid crystal having one of a negative dielectric anisotropy and a positive dielectric anisotropy, when the nematic liquid crystal of the liquid crystal layer is the negative dielectric anisotropy, an alignment direction of liquid crystal molecules of the off-state is perpendicular to the surface of the Fresnel lens and the Fresnel lens is made of a uniform refractive index material having a refractive index $n_F$ equal to the ordinary refractive index $n_O$ of the liquid crystal layer, and when the nematic liquid crystal of the liquid crystal layer is the positive dielectric anisotropy, the alignment direction of liquid crystal molecules of the off-state state is parallel with the surface of the Fresnel lens and the Fresnel lens is made of a birefringent material having an extraordinary refractive index $n_{Fe}$ equal to the extraordinary refractive index $n_e$ ($n_e \neq n_O$) of the liquid crystal layer and an ordinary refractive index $n_{FO}$ ($n_{Fe} \neq n_{Fo}$) equal to the ordinary refractive index $n_O$ of the liquid crystal layer or the Fresnel lens is made of a uniform refractive index material having a refractive index $n_F$ equal to the extraordinary refractive index $n_e$ of the liquid crystal layer and a polarizing Fresnel lens is formed on said one of the pair of transparent substrates and for canceling a phase difference generated between ordinarily polarized incident light into the liquid crystal lens element in the off-state and transmission light.

2. The liquid crystal lens element according to claim 1, wherein a phase correction surface constituted by a plurality of steps is formed on at least one of the pair of transparent substrates, and the step height of each step corresponds to an optical path difference equal to an integer times of a wavelength $\lambda_1$ and a wavelength $\lambda_3$, and correspond to an optical path difference of non-integer times of a wavelength $\lambda_2$, provided that $\lambda_1$, $\lambda_2$ and $\lambda_3$ ($\lambda_1 < \lambda_2 < \lambda_3$) are three different incident wavelengths.

3. The liquid crystal lens element according to claim 1, wherein a diffraction grating is formed in a peripheral portion of a flat surface of the pair of transparent substrates opposite from the sandwiched liquid crystal layer.

4. An optical head device comprising:
a light source configured to emit light;
an objective lens configured to converge the light from the light source on an optical recording media having different cover layer thicknesses; and
a photodetector configured to detect light converged by the objective lens and reflected by an information recording layer of each of the optical recording media,
wherein the liquid crystal lens element as defined in claim 1 is disposed in an optical path between the light source and the objective lens, the liquid crystal lens element is configured to correct wavefront aberration for the optical recording media by changing transmission wavefront generated in the on-state and expand the distance between the objective lens and the optical recording medium.

5. An optical head device comprising:

a light source configured to emit light of wavelength λ;

an objective lens configured to converge emission light from the light source on an optical recording medium;

a beam splitter configured to split light converged by the objecting lens and reflected by the optical recording medium; and a photodetector configured to detect the split light, wherein the optical recording medium has at least two information recording layers having different cover layer thicknesses, the liquid crystal lens element as defined in claim 1 is disposed in an optical path between the light source and the objective lens, and the optical head device is configured to carry out at least one of writing to and reading from information recording layers having different cover layer thicknesses by switching applied voltage between applied voltage of the off-state and applied voltage of the on-state of the liquid crystal lens element.

6. The optical head device according to claim 4, wherein the liquid crystal lens element comprises a first liquid crystal lens element portion and a second liquid crystal lens element portion; the first liquid crystal lens element portion and the second liquid crystal lens element portion each comprising a Fresnel lens having a concave-convex portion formed on a flat surface of said one of the transparent substrates opposed to the other substrate, having a cross-section of concave-convex shape and made of a uniform refractive index material having a refractive index equal to the ordinary refractive index $n_o$ of the liquid crystal layer, a first transparent electrode formed on a flat surface of said one of the transparent substrates on which the Fresnel lens is formed, and a second transparent electrode formed on a flat surface of said the other transparent substrate opposed to said one of the transparent substrates;

wherein the liquid crystal layer is a nematic liquid crystal having negative dielectric anisotropy in which the alignment direction of liquid crystal molecules in the off-state is perpendicular to the surface of the Fresnel lens, and substantial refractive index $n(V)$ of the liquid crystal layer changes between a refractive index of an off-state at a time of no voltage application (V=0) and a refractive index of an on-state at a time of voltage application for extraordinarily polarized incident light according to the magnitude of voltage V applied between the first transparent electrode and the second transparent electrode, and the substantial refractive index $n(V)$ of the liquid crystal layer is the ordinary refractive index $n_o$ regardless of the magnitude of applied voltage for ordinarily polarized incident light, and the directions of ordinary refractive index of the liquid crystal layers of the first liquid crystal lens portion and the second liquid crystal lens portion in on-state are perpendicular to each other.

* * * * *